United States Patent [19]
Rubbert

[11] 3,948,587
[45] Apr. 6, 1976

[54] RETICLE AND TELESCOPIC GUNSIGHT SYSTEM

[76] Inventor: Paul E. Rubbert, 2001 - 86th Ave. NE., Bellevue, Wash. 98004

[22] Filed: Jan. 28, 1974

[21] Appl. No.: 437,342

[52] U.S. Cl. .................... 356/21; 33/245; 350/10
[51] Int. Cl.² ............................................ G01C 3/20
[58] Field of Search ........... 356/21; 33/245; 350/10, 350/11

[56] References Cited
UNITED STATES PATENTS

| | | | |
|---|---|---|---|
| 3,392,450 | 7/1968 | Herter et al. | 33/245 |
| 3,782,822 | 1/1974 | Spence | 350/10 |

Primary Examiner—Alfred E. Smith
Assistant Examiner—F. L. Evans
Attorney, Agent, or Firm—Christensen, O'Connor, Garrison & Havelka

[57] ABSTRACT

Disclosed are telescopic gunsights for aiding shooters to achieve proper "hold-over" when shooting at targets of estimatable heights at long ranges. The reticles in the preferred telescopic gunsights comprise two or more superjacent target-spanning and aiming apertures of differing heights. By comparing the height of a target image viewed through the sight to the height of one or more of the apertures, the shooter can determine the aiming sight picture which produces the hold-over necessary to strike the target. Using the preferred variable power scopes of this invention the shooter can rapidly make adjustments so that the scope will be "calibrated" for any one of a plurality of target heights and/or trajectories, and for trajectory variations caused by altitude and ambient temperature variations and for angles of fire differing substantially from horizontal.

91 Claims, 20 Drawing Figures

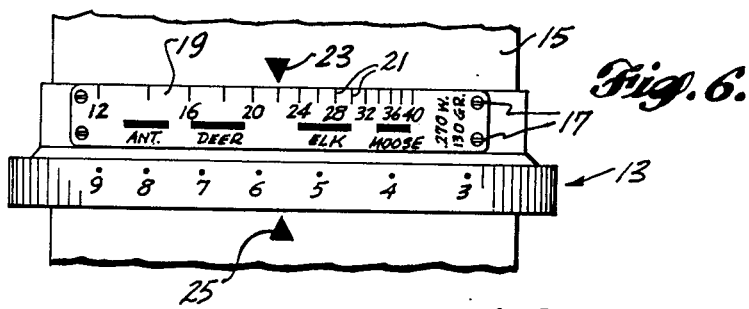
Fig. 6.
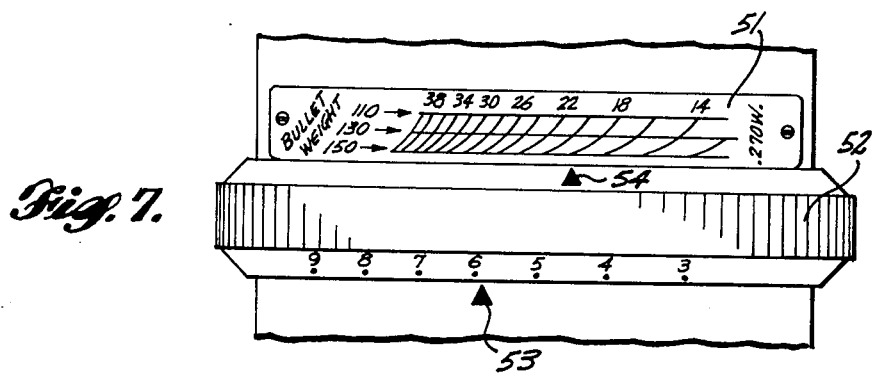
Fig. 7.
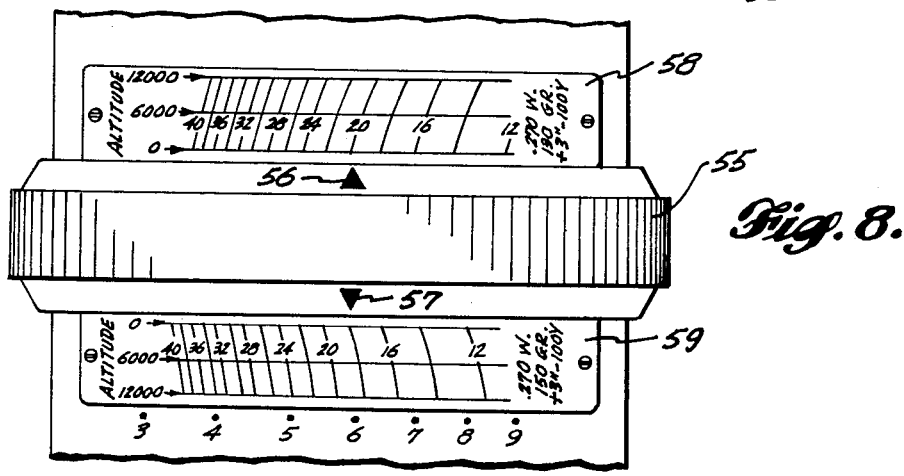
Fig. 8.
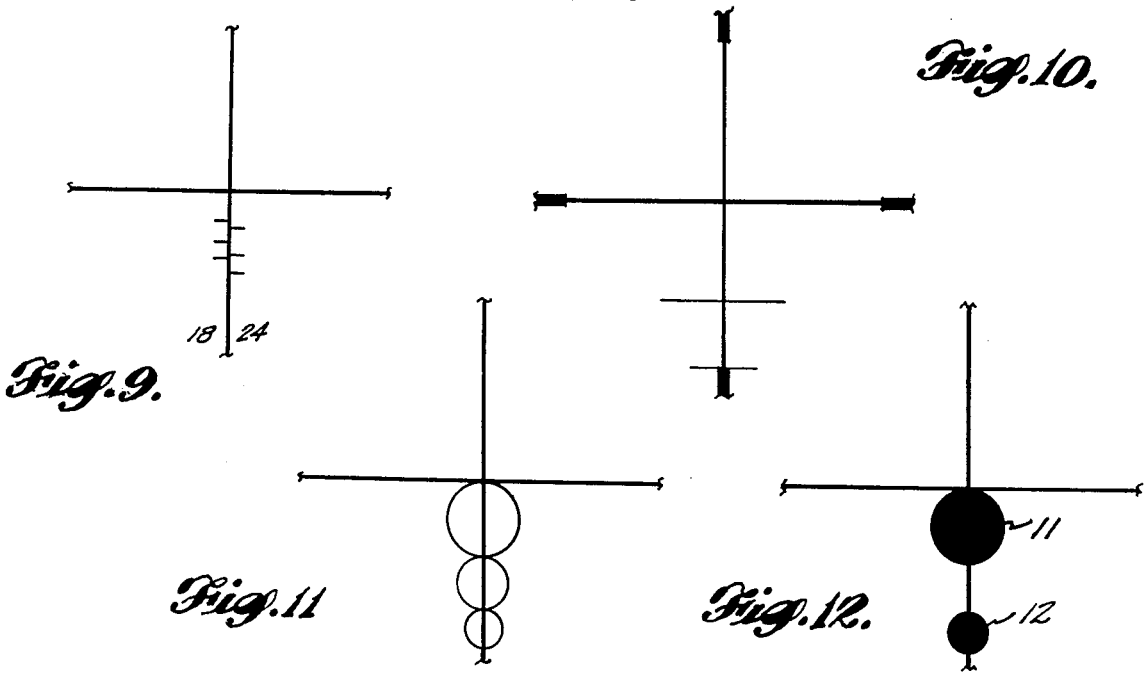
Fig. 9.
Fig. 10.
Fig. 11.
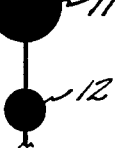
Fig. 12.

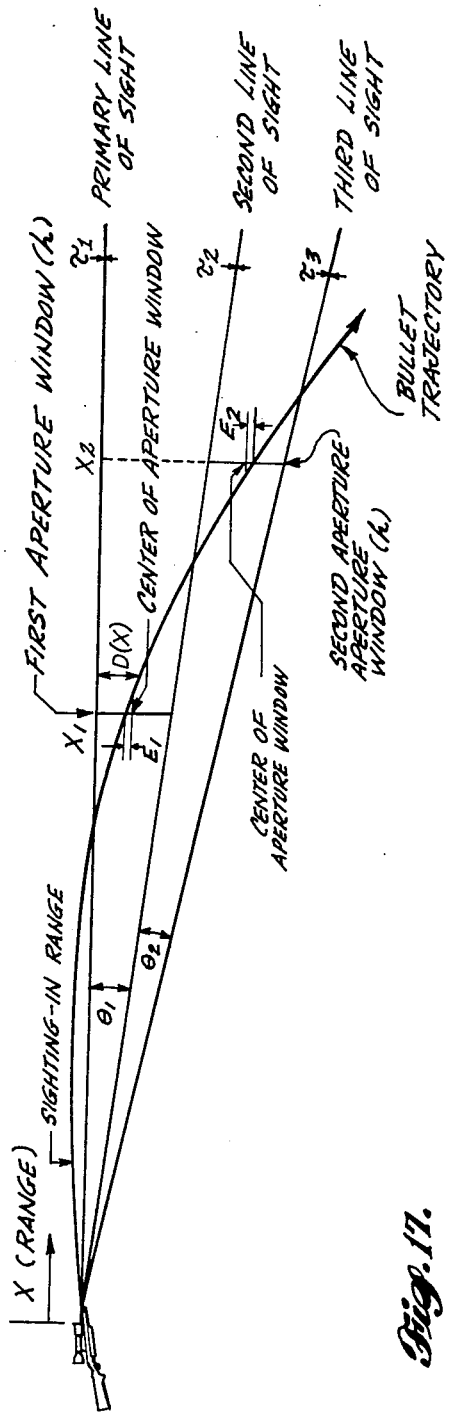
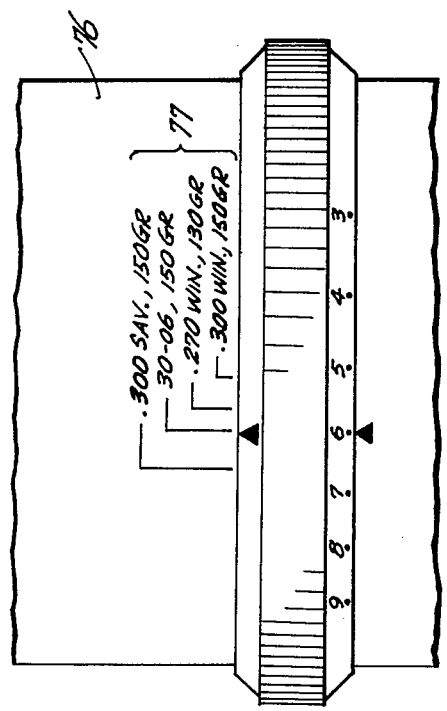

RETICLE AND TELESCOPIC GUNSIGHT SYSTEM

BACKGROUND OF THE INVENTION

This invention relates to telescopic gunsights (sometimes referred to hereinafter merely as "scopes" or "sights"), to reticles useful therein, and to firearms equipped with telescopic sights. The scopes of this invention are discussed herein principally with reference to their use on rifles. It will become apparent, however, that they also may be used on other devices capable of propelling projectiles along substantially predeterminable trajectories, e.g., handguns, crossbows, longbows and artillery.

A factor which must be taken into account in long-range shooting is the curved trajectory traversed by a bullet as it falls below the axis of the rifle bore while traveling the distance from the rifle muzzle to the target, i.e., "range." An aiming line of sight emanating from a reticle aiming point of a scope rigidly affixed to a rifle is straight, and hence the line of sight can intersect the curved trajectory only at discrete ranges. At ranges other than these the bullet will pass below or above the aiming line of sight, necessitating the use of "hold-over" or "hold-under" in aiming. There have been proposed in the prior art numerous reticles and scopes designed to provide the shooter with information concerning the approximate range to a target and/or to provide the shooter with a plurality of aiming points for shooting at targets at various ranges, i.e., aiming points producing line of sight/trajectory intersections at various ranges. (See *Gunsight Guide* [Stoeger Arms Corp. 1968], pages 165–172 for a discussion of some such reticles and scopes.)

There are very accurate range-finder devices which function on a triangulation principle. Most scopes, however, are not large enough to accommodate this sort of system. As a consequence, most range-finding capability found in prior art scopes is based on the principle that if the angle subtended by a target of known or estimatable size can be determined, then the range can be calculated, or at least approximated. Such scopes therefore have included reticle features such as dots, cross hair pairs, apertures or posts subtending known angles. By comparing the apparent size of one of these features to the image of a target of known or estimatable height viewed through the scope, the range of the target can be estimated. Thus, if a dot subtending six inches at a range of 100 yds. (i.e., subtending 6 "minutes of angle," as that expression is used herein and in the appended claims) subtends only ⅔ of a target estimated to be 18 inches high, i.e., subtends 12 inches, then the estimated range can be calculated: Estimated Range = (12 inches / 6 inches) × 100 yds. = 200 yds.

Range-finding capability alone is insufficient to achieve proper aiming. The shooter usually must also determine the correct hold-over for the estimated range and estimate the aiming sight picture that will provide the correct hold-over. This usually requires reference to memorized or recorded bullet trajectory information, and requires mental calculations to convert the hold-over to units of the target's height for reference in establishing the proper aiming sight picture. Some prior art scopes provide a plurality of range-related aiming points intended to assist the shooter in estimating the appropriate aiming sight picture for various ranges.

Exemplary of specific prior art scopes of the types just described are those disclosed in U.S. Pat. No.'s 3,190,003; 1,190,121; 3,392,450; 3,431,652; and 3,492,733. The last four of these patents propose scopes providing a plurality of range-related aiming points accompanied with aiming point selection means, the use of which depends on relative height of the image of a target of known or estimatable height compared to the height of a feature in the reticle. Scopes of this general type are sometimes referred to hereinafter as "point-of-aim" scopes.

SUMMARY OF THE INVENTION

This invention is directed to telescopic gunsights, to reticles useful therein, and to firearms equipped with telescopic sights.

In one aspect of this invention there is provided a telescopic sight for targets of known or estimatable heights in combination with a firearm capable of propelling a bullet along a substantially predeterminable trajectory. The telescopic sight includes a reticle comprising means defining first and second vertically spaced target-spanning and aiming apertures located proximate the center of the field of view of the scope, the lower margin of the first aperture being substantially coincident with the upper margin of the second aperture, i.e., the second aperture is immediately subjacent the first. The vertical dimension of the first aperture is greater than the vertical dimension of the second aperture. The first aperture is so vertically dimensioned that when a first target of height h is located at a first distance from the scope-sighted firearm such that the upper and lower margins of the first aperture respectively coincide with the upper and lower margins of the first target when viewed through the scope and the firearm is discharged with the target thus aligned in the first aperture, the bullet discharged will strike the first target; and the second aperture is so vertically dimensioned that when a second target of height h is located at a second distance from the firearm such that the upper and lower margins of the second aperture respectively coincide with the upper and lower margins of the second target when viewed through the scope and the firearm is discharged with the target thus aligned in the second aperture, the bullet discharged will strike the second target, the distance to the second target being substantially greater than the distance to the first target; and when a third target of height h is located at a third distance from the firearm substantially greater than the first distance and substantially less than the second distance such that the height of the image of the target appears substantially less than the vertical height of the first aperture and substantially greater than the vertical height of the second aperture when viewed through the scope, a bullet discharged from the firearm will strike the target when the scope is aimed such that the point midway between the lower and upper margins of the respective upper and lower apertures is aligned with the vertical center of the third target when viewed through the scope.

In another aspect of this invention, there is provided a variable power scope adjustable for targets of differing known or estimatable heights and/or use with differing trajectories. The scope preferably includes a reticle of the type described immediately above, the reticle being positioned within the scope such that the apparent angles subtended by the apertures vary inversely to the power of magnification.

In another aspect, this invention provides a variable power scope including a reticle comprising at least one target-spanning and aiming aperture, the vertical dimension of the aperture being small in comparison to the field of view of the scope. The reticle is positioned within the scope such that the aperture is located proximate the center of the field of view of the scope and such that the apparent angle subtended by the aperture varies inversely to the power of magnification. Associated with the power-varying means of this scope is a target height indicator means for indicating or selecting one of a plurality of target heights (the magnitude of the indicated target height varying inversely to the power of magnification), and/or a trajectory indicator means for indicating or selecting one of a plurality of values of at least one parameter affecting bullet trajectories, the indicated values varying with the power of magnification.

In another aspect, this invention provides a variable power scope including a reticle comprising means defining a target-bracketing device having spaced-apart visible portions for spanning a target of known or estimatable height, and means defining an aiming point related to the target-bracketing device, the aiming point being spaced vertically apart from the optical axis of the scope and spaced apart from the target bracketing device. The reticle is so positioned within the scope that the apparent angles subtended by the elements of the reticle vary inversely to the power of magnification. Associated with the power-varying means of this scope are target height and/or trajectory indicator means of the general types described immediately above.

In still another aspect, there is provided a variable power scope includng a reticle comprising means defining a plurality of aiming points vertically aligned and vertically spaced apart from one another, and a plurality of target-bracketing devices spaced apart from the aiming points, each of these devices being related to a respective one of the aiming points and having spaced-apart visible portions for spanning a target of known or estimatable height. The reticle is so positioned within the scope that the apparent angles subtended by the elements of the reticle vary inversely to the power of magnification, and the scope is adjustable for targets of differing known or estimatable heights and/or for use with differing trajectories.

Other aspects of this invention will become apparent from the drawings and the following description.

BRIEF DESCRIPTION OF THE INVENTION

With reference to the accompanying drawings:

FIGS. 6–8 and 13–15 show target height indicator plates useful on variable power scopes of the type shown in FIG. 5.

FIGS. 9–12 show the center portions of four embodiments of the reticle of this invention.

FIG. 16 is a graphic representation of a bullet's trajectory and lines of sight emanating from a scope reticle of this invention illustrating an arrangement wherein the bullet trajectory deviates slightly from the centers of targets bracketed by the lines of sight as is sometimes required to adapt a given scope reticle configuration to an arbitrary trajectory and/or target height.

FIG. 17 shows trajectory indicator means useful on variable power scopes of the type shown in FIG. 5.

FIG. 18 is an enlarged view of a reticle having target-bracketing devices and related aiming points.

DETAILED DESCRIPTION OF THE INVENTION

Figure 1:
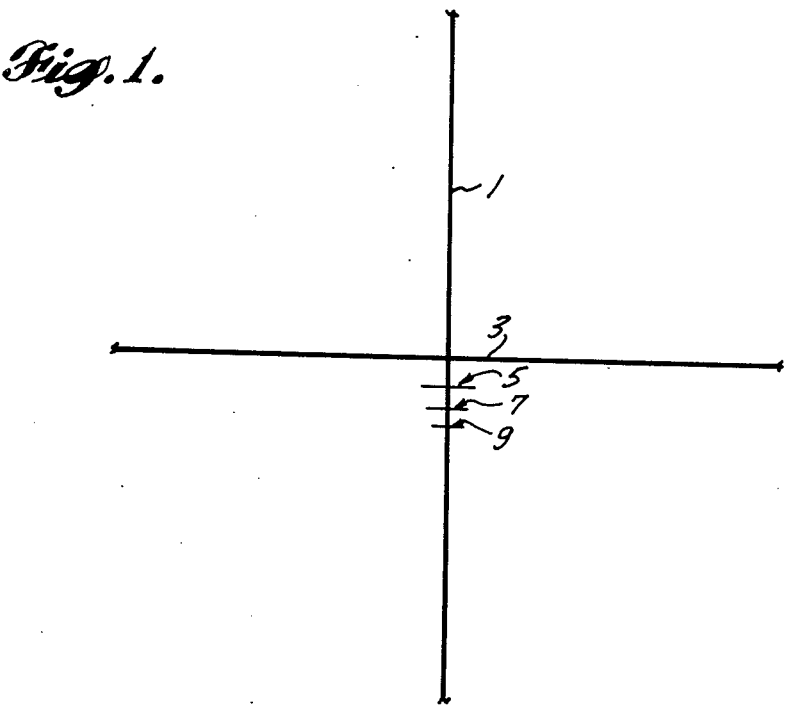
FIG. 1 is an enlarged view of a reticle according to this invention having a plurality of target-spanning and aiming apertures.
Figure 2:
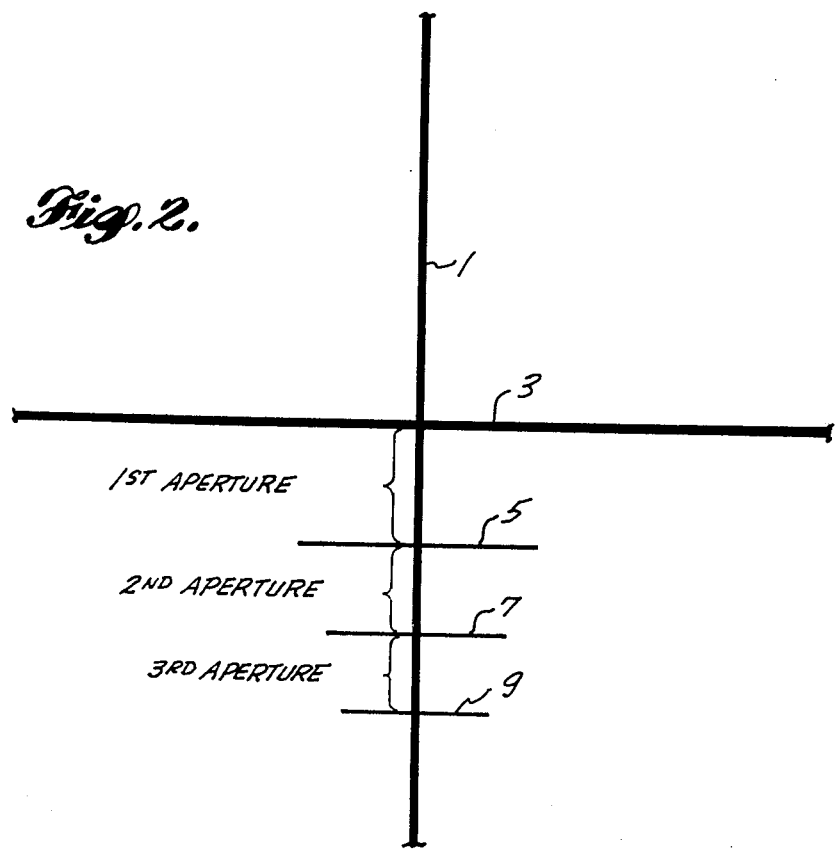
FIG. 2 is an enlarged view of the center portion of the reticle of FIG. 1.
Figure 4:
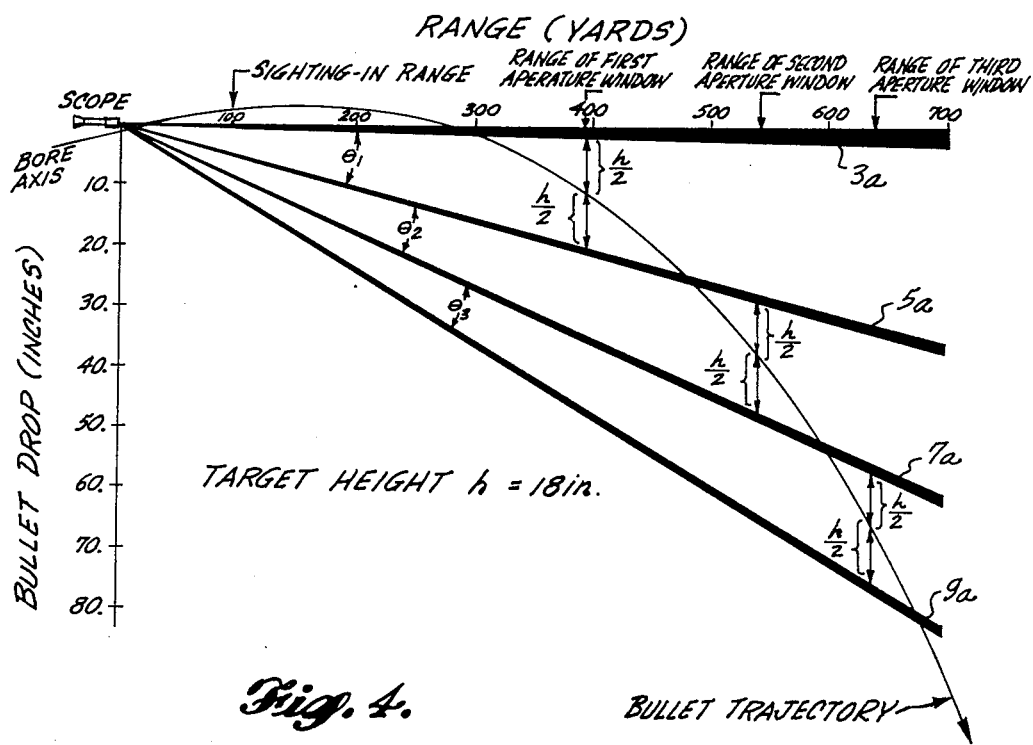
FIG. 4 is a graphic representation of a bullet's trajectory and lines of sight emanating from a scope reticle of this invention configured for a target height of 18 inches and for the trajectory depicted.

The reticle of FIGS. 1 and 2 includes a vertical cross hair 1 (indicating windage alignment) and a primary horizontal cross hair 3 (indicating elevation), which extend across the field of view of a scope and intersect proximate the center of the field of view. The reticle also includes three additional horizontal cross hairs 5, 7, 9 spaced apart below the primary horizontal cross hair 3. It will be seen that the four horizontal cross hairs define first, second and third apertures, the vertical dimension of the first aperture being greater than that of the second and that of the second being greater than that of the third. The manner in which the vertical dimensions of the apertures are selected can be best understood by reference to FIG. 4 wherein there is plotted the trajectory ("Range" versus "Bullet Drop") of a bullet fired from a rifle equipped with a scope including the reticle of FIGS. 1 and 2. The trajectory represented is that of a bullet propelled at a muzzle velocity of 3200 feet per second (f.p.s.) and having a ballistic coefficient (C) of 0.406. (See *Hatcher's Notebook*, The Stackpole Company, 1962, Chapter XXIII for discussion of ballistic coefficient and the calculation of a trajectory.) The depicted rifle/scope combination has the axis of the scope positioned 1.5 inches above the axis of the rifle bore, and is sighted in such that the bullet will strike three inches above the center of the primary line of sight at a range of 100 yds. (This is a "sighting-in point" frequently used with today's flat-shooting cartridges because it permits essentially point-blank aiming at big game at ranges up to approximately 300 yds.) Lines of sight 3a, 5a, 7a and 9a, shown superimposed over the bullet trajectory, are graphical extensions of and emanate from cross hairs 3, 5, 7 and 9, respectively, (FIGS. 1 and 2). The target height $h$ for which the reticle in FIG. 4 is configured is 18 inches. The spacing between the lower edge of the primary cross hair 3 and the upper edge of cross hair 5 for any target height $h$ is selected by determining the range at which the bullet has dropped a distance of $h/2$ below the lower edge of the primary line of sight 3a. This range is sometimes referred to hereinafter as the "range of first aperture window" (See FIG. 4). For a target height of 18 inches and the bullet trajectory shown in FIG. 4, the range of the first aperture window can be calculated or empirically determined to be approximately 395 yds. The second horizontal cross hair is then spaced below the primary cross hair such that the upper edge of the second line of sight 5a and the lower edge of the primary line of sight 3a will subtend height h at the range of the first aperture window. Having so determined the spacing between the primary and second cross hairs the spacing between the second and third cross hairs can be similarly determined. Thus, the range ("range of second aperture window," FIG. 4) at which the bullet has dropped a distance of $h/2$ below the lower edge of the second line of sight $5a$ is determined (here, approximately 541 yds.) and the third horizontal cross hair 7 is spaced below the second such that the upper edge of the third line of sight $7a$ and the lower edge of the second line of sight $5a$ will subtend height h at the range of the second aperture window. Similarly, the range at which the bullet has dropped a distance of $h/2$ below the lower edge of the third line of sight $7a$ ("range of third aperture window", FIG. 4) can be determined to be approximately 639 yds. and the spacing between the third and fourth horizontal cross hairs 7 and 9 can thus be calculated. Any number of additional horizontal cross hairs could be included in the reticle, with their spacings being determined as described above.

For the trajectory and target height assumed in FIG. 4, the angles between the four lines of sight, i.e., $\theta_1$, $\theta_2$ and $\theta_3$, are 4.55, 3.33 and 2.82 minutes of angle ("M.O.A."), respectively, 0.50 M.O.A. being subtended by the primary horizontal cross hair 3 and 0.25 M.O.A. being subtended by each of the second, third and fourth cross hairs 5, 7 and 9.

The vertical spacings thus established for the horizontal cross hairs obviously depend on the trajectory, the sighting-in relationship between the primary line of sight and the trajectory, the offset of the scope from the bore axis, the target height $h$, and the cross hair thicknesses used. The physical construction of such a reticle can be by conventional methods, i.e., cross hair assemblies, chemical milling, etching on transparent discs, etc.

Figures 3A, 3B, 3C:
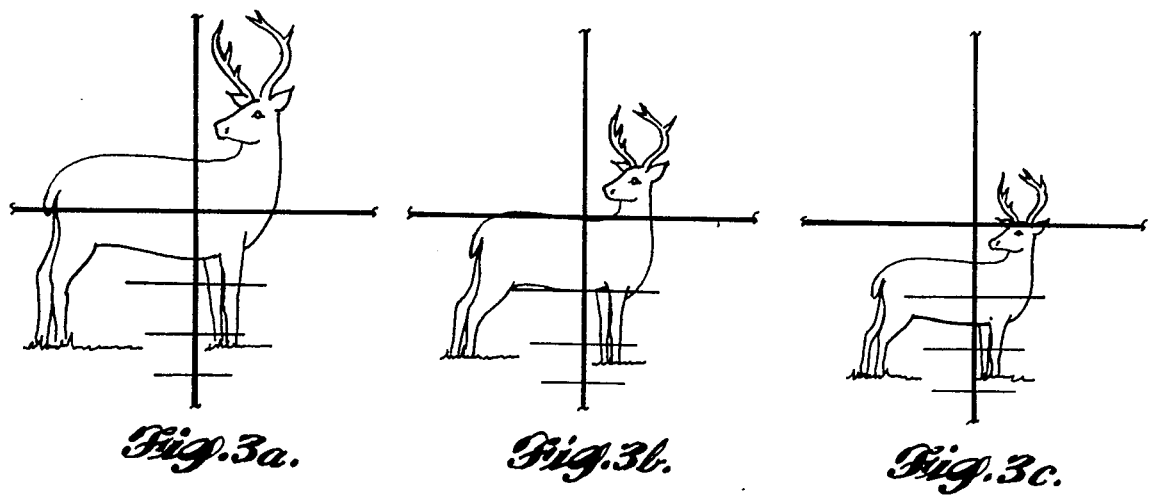
FIGS. 3a–3c illustrate the manner in which the reticle of FIG. 1 is used.

FIGS. 3a–3c depict aiming sight pictures showing how a scope of this invention including a reticle of the type shown in FIGS. 1 and 2 can be used in shooting at targets of estimatable heights at various ranges. The reticle shown in FIGS. 3a–3c is configured for a target height of 18 inches, which is the commonly accepted depth of the chest of an "average" deer. In FIG. 3a the image of the deer's chest appears to be substantially bigger than the vertical dimension of the first aperture. Therefore, the range of the deer from the shooter must be substantially less than the range of the first aperture window and "point-blank" aiming using the intersection of the primary horizontal and vertical cross hairs should produce a solid hit. In FIG. 3b, the image of the deer's chest is subtended by the primary and second horizontal cross hair and the deer must therefore be at or very near the range of the first aperture window. Therefore, if the sight picture shown in FIG. 3b is maintained (i.e., with the primary and second horizontal cross hairs spanning or bracketing the deer's chest) while the rifle is fired, the bullet will strike approximately at the center of the deer's chest. In FIG. 3c, the image of the deer's chest appears substantially smaller than the vertical dimension of the first aperture and substantially larger than the vertical dimension of the second aperture. Thus, the deer must be at a range approximately midway between the ranges of the first and of the second aperture windows and use of the intersection of the second horizontal cross hair and the vertical cross hair as the aiming point should produce a solid hit near the center of the deer's chest.

From FIGS. 3a–3c it will be seen that the four horizontal cross hairs provide seven distinct aiming points, i.e., three apertures plus the four intersections of the horizontal cross hairs with the vertical cross hair. Thus, if the image of the deer's chest spans any aperture, an aiming sight picture with the deer's chest centered in that aperture and its intersection with the vertical cross hair will cause the bullet to strike approximately the center of the deer's chest. Or, if the image of the deer's chest appears substantially smaller than one aperture and substantially larger than the neighboring subjacent aperture, then an aiming sight picture wherein the intersection of the vertical cross hair and the horizontal cross hair located between these two neighboring apertures is aligned with the center of the image of the deer's chest should produce a solid hit near the center of the deer's chest.

It will be noted that the ability to consistently aim so as to hit the target is not dependent upon the apparent height of the target image being such as to either exactly span an aperture or to be midway in height between the heights of two adjacent apertures. Thus, the limiting target image heights (for a target of "standard" height for which the reticle is configured) for which the aiming sight picture of FIG. 3c (i.e., the intermediate cross hair 5 centered on the image of the deer's chest) will produce a hit on the target will be seen from FIG. 4 to be (1) the limit as the target image height approaches the apparent height of the first aperture (i.e., the range to the target approaches the range of the first aperture window), in which case the bullet would strike the target at a point approaching the top of the deer's back a distance $h/2$ above the second line of sight $5a$, and (2) the limit as the target image height approaches the height of the second aperture (i.e., the range to the target approaches the range of the second aperture window), in which case the bullet would strike the target at a point approaching the bottom of the deer's chest a distance $h/2$ below the second line of sight. Hence, if the target image height of the standard target appears to be any amount smaller than the height of the first aperture and any amount larger than the height of the second aperture, an aiming sight picture with the intermediate cross hair 5 centered on the deer's chest (FIG. 3c) will produce a hit on the target. This same characteristic, i.e., to always produce a hit on a target whose standard image height appears to be anywhere intermediate to the heights of any two adjacent apertures by aiming with the cross hair separating the two apertures will be seen to prevail for all aperture pairs. (This analysis assumes that the cross hair thicknesses are negligible compared with the vertical dimensions of the apertures such that neighboring apertures are essentially adjacent, or that the centers of the cross hairs define the margins of the apertures.

Normally, however, a shooter would select an aperture as the aiming sight picture rather than a cross hair if the target image height appeared to be significantly closer to the apparent height of one of the apertures than to the average between the heights of two adjacent apertures. Thus it will be apparent from this discussion and from FIGS. 3 and 4 that is a shooter uses all of the available distinct aiming sight pictures, with no interpolation between them in aiming, and is capable of judging whether a target image height is nearer an aperture height or nearer a height midway between two adjacent apertures, then the maximum deviation of the bullet impact point from the center of the target should not exceed approximately $h/4$ or one quarter of the target height. This maximum deviation will occur when the target is located intermediate the ranges associated with an adjacent pair of distinct aiming points and the shooter uses one of the adjacent distinct aiming points to aim, with no attempt to interpolate. If the shooter chooses to interpolate between the distinct aiming points in aiming, then the maximum aiming error can be reduced to less than approximately $h/4$. It will also be apparent that the maximum deviation of the bullet impact point from the center of the target (sometimes referred to hereinafter as the "aiming error") will be essentially independent of the number of apertures contained within a preferred reticle of the present invention. The maximum aiming error is thus essentially independent of the range to the target up to the maximum effective aiming range of the reticle, which for a preferred reticle of the present invention can be defined to be approximately the range at which the bullet has dropped a distance $h/4$ below the line of sight emanating from the intersection of the vertical cross hair with the cross hair defining the lower margin of the lowermost aperture. This invariance of the maximum aiming error with range is a feature not possessed by other prior art scopes containing reticles having multiple aiming points of which I am aware.

A limitation to the maximum number of apertures that can be effectively utilized (and hence a limit to the ultimate range capability) with a reticle of the present invention arises from the fact that the difference in height between additional adjacent apertures becomes less as more apertures are subjacently added (i.e., the difference in height between third and fourth apertures is less than the difference in height between second and third apertures, etc.). Thus, as the number of apertures is increased, a limit would finally be reached wherein a shooter would be unable to distinguish apparent differences in adjacent aperture heights as compared to the target image height so as to be able to select the appropriate distinct aiming point. However, it will be recognized that this limit corresponds essentially to the basic limit of any optical device based on a target-bracketing principle to provide the shooter with information concerning the angle subtended by the target within the tolerance required to enable him to consistently hit the target. Up to this limit, the preferred reticles of the present invention provide a level of maximum aiming error which is invarient with range and which is sufficiently small to ensure a hit on the target within approximately $h/4$ of the desired bullet impact point.

Referring again to FIG. 4, it will be apparent that the reticle could have been configured such that at the ranges where the apertures subtend the image of a target of selected height $h$, the bullet would have dropped some other fraction $x$ ($0 \quad x \quad 1$) of the target height $h$ below the line of sight emanating from the upper margin of a given aperture. The line of sight defining the lower margin of the aperture would then be $(1-x).h$ below the bullet trajectory at that range. A purpose for such a configuration would be to produce hits at predetermined points above or below center of the target when using the aiming sight pictures of FIG. 3.

It will also be apparent that the centers of the horizontal cross hairs, rather than their edges, could be used as reference points in configuring the reticle and in performing the aperture height/target image height comparisons necessary in aiming. Use of the centers of the horizontal cross hairs as the reference points (i.e., as the margins of the apertures) is, in fact, preferred for the following reason. Selection of the proper aiming sight picture requires the shooter to make "less than, equal to, or greater than" evaluations when comparing target image height with aperture heights. The precise positions of the upper or lower margins of a target image can be hidden by the cross hairs which must be of finite thickness in order to be visible. Hence, there is a small range of target image heights for which both margins of a target image can be simultaneously hidden behind the cross hairs defining an aperture such that the target image appears, without more detailed examination, to fit the aperture exactly. If the near edges of the cross hairs are used as reference points (e.g., as in FIG. 4), then a shooter can readily discern when a target image height is smaller than the height of the aperture. But, the target image height could be greater than the height of the aperture by up to an amount equal to the sum of the apparent heights of both cross hairs bounding the aperture before the shooter could immediately discern the target image height to be greater than the apparent height of the aperture. It will also be apparent that the far edges of the cross hairs could be used as reference points, in which case the shooter could readily discern when the target image height is larger than the height of the aperture, but for which the target image height could be less than the height of the aperture by up to an amount equal to the sum of the apparent heights of both cross hairs bounding the aperture before the shooter could immediately discern the target image height to be less than the apparent height of the aperture. However, if the centers of the horizontal cross hairs are used as the margins of the apertures, as is preferred, then the maximum deviation of the target image height from the aperture height that could not be immediately discerned will be only one half of the sum of the apparent heights of the cross hairs bounding the aperture. Hence it is preferred that the centers of the horizontal cross hairs be used as reference points defining the margins of the apertures because the maximum deviation in target image height from the aperture height that could not be readily discerned due to the possibility of the upper and lower margins of the target being hidden behind the cross hairs is minimized.

It will be apparent that when the maximum deviation of target image height from an aperture height that could not be readily discerned increases, a shooter's ability to consistently hit near the center of the target decreases, and if this deviation exceeds a certain value a complete miss of the target could result. Referring to FIG. 4, if the angle subtended by line of sight $5a$ is assumed to be equal to $\theta_1$ minus $\theta_2$, then the vertical distance between the upper margin of line of sight $5a$ and the upper margin of line of sight $7a$ at the range of the first aperture window will be equal to the target height $h$. Hence, a target of height $h$ situated at the range of the first aperture window would appear, in the absence of a more detailed examination, to fit both the first and second apertures (i.e., the scope could be aligned such that both margins of the target image would be simultaneously obscured by the cross hairs with the target image positioned in either of the two apertures, even if lines of sight $3a$ and $7a$ were infinitesimally thin). A shooter encountering such a situation would probably decide to aim using the sight picture shown in FIG. 3c (because that sight picture represents an average of the two aperture-spanning aiming sight pictures among which the shooter could not readily establish a preference). This aiming sight picture would result in a grazing miss of the target with the bullet striking proximate the upper margin of the target, since it will be apparent from FIG. 4 that, at the range of the first aperture window, the bullet trajectory passes a distance $h/2$ above line of sight $5a$ which would be aligned proximate the vertical center of the target in aiming.

It will also be apparent (i.e., from a similar analysis) that if the far edges of the cross hairs are used as reference points in configuring the reticle (i.e., such that the lower edge of a cross hair positioned between two apertures defines the lower margin of the upper aperture, and the upper edge of the cross hair defines the upper margin of the lower aperture) and if the angle subtended by a horizontal cross hair positioned between two apertures is as great as the difference of the angles subtended by the two apertures ("difference of the angles" being the angle subtended by the upper aperture minus the angle subtended by the lower aperture), then a shooter could encounter a similar situation wherein both margins of the target image would be simultaneously obscured by the cross hairs with the target image positioned in either of the two apertures. This would occur when the target is positioned at the range of the aperture window of the lower aperture, and if a shooter encountering this situation were to aim using the sight picture representing the average elevation between the two aperture-spanning sight pictures, the bullet would strike proximate the lower margin of the target.

If the vertical centers of horizontal cross hairs are used as reference points in configuring the reticle, as is preferred, and the angle subtended by a horizontal cross hair positioned between two apertures is as great as the difference of the angles subtended by the two apertures, then the situation wherein both margins of the target image would be simultaneously obscured by the cross hairs with the target image positioned in either of the two apertures could also be encountered. But this would now occur when the target is located at a range approximately midway between the ranges of the two aperture windows, and if a shooter encountering this situation aims and fires using the sight picture representing the average elevation between the two aperture-spanning sight pictures, the bullet would strike proximate the center of the target. Hence it will be apparent that aiming errors caused by margins of target images being obscured by opaque horizontal cross hairs are less and also that the use of thicker horizontal cross hairs can be tolerated when the centers of horizontal cross hairs, rather than the edges, are used to define the margins of apertures.

It will generally be desired that, when edges of opaque elements (such as cross hairs) of a reticle are used to define the margins of apertures, the vertical angle (i.e., height) subtended by an opaque reticle element serving as a common boundary between two adjacent apertures (i.e., serving as common means defining the lower and upper margins of respective upper and lower apertures) will not exceed the difference of the vertical angles (i.e., heights) subtended by the two adjacent apertures, and it will be preferable that the height of such an opaque reticle element not exceed approximately one half this value. Cross hair thickness needed for adequate visual resolution varies with the power of magnification of the scope, but for the types of hunting scopes being considered it will generally also be desired that the vertical thickness of an opaque reticle element spacing apart the upper margin of a lower aperture from the lower margin of an immediately subjacent aperture not exceed approximately one quarter of the vertical height of the upper aperture. These same limits concerning maximum desired cross hair thickness do not apply when the centers of horizontal cross hairs are used to define the margins of apertures, for reasons previously discussed.

In FIGS. 9 – 12, there are shown four other embodiments of the reticle of this invention. The reticle of FIG. 9 is similar to that of FIGS. 1 and 2, but includes two sets of apertures (three apertures each), one set being for 18 inch targets and the second for 24 inch targets as indicated. In the reticle of FIG. 10, the vertical cross hair and primary horizontal cross hair are enlarged along portions of their length but are fine at their center. This reticle has only two target-spanning and aiming apertures. This is a preferred embodiment. It is the least cluttered of any embodiments shown, and the heavier outer parts of the vertical and primary horizontal cross hairs serve to guide the eye naturally to the center uner conditions of fast, close-range shooting where the long range capability is not used. The truncation of the second and third horizontal cross hairs enables a shooter to discern more precisely the position of a margin of a target image relative to an aperture margin (by viewing the target image margin at the truncated ends of the cross hairs). The use of only two apertures allows a single scope to be easily adapted to a variety of different trajectories, as explained hereinafter. As will be noted from FIG. 4, two apertures will provide definite aiming points up to a range where the bullet trajectory has dropped a distance below the primary line of sight which exceeds twice the height of the standard target. For the trajctory and target height shown in FIG. 4 the furthermost aiming point range is approximately 600 yds. where the cross hair defining the lower margin of the second aperture would be used in aiming. It will be appreciated that delineations of range could be added to the reticle for both the aperture and aperture margin aiming points. However, this is not preferred since such delineations would clutter the reticle and are not needed to provide the proper holdover in aiming.

In FIG. 11, the aperture-defining members are circles rather than straight, horizontal cross hairs. This embodiment is not preferred between the reticle is more cluttered than in embodiments previously discussed.

In the embodiment of FIG. 12, the first aperture is defined by the top and bottom edges of the larger dot 11, the second aperture by the bottom edge of dot 11 and the top edge of the smaller dot 12, and the third aperture by the top and bottom edges of dot 12. The dots 11, 12 could be replaced by vertically elongated rectangles. These dots or rectangles are not preferred because much of the target would be obscured by the aperture-defining components of the reticle.

Figure 5:
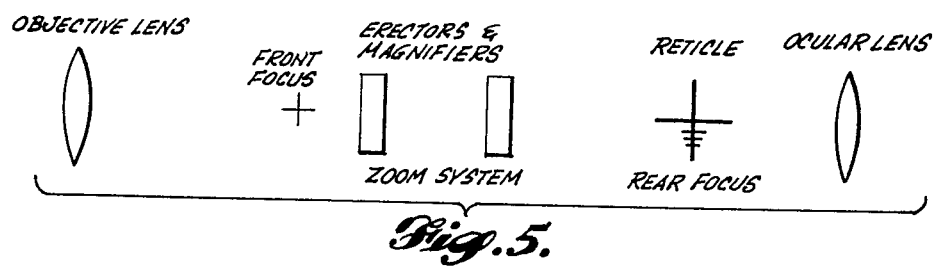
FIG. 5 is a schematic illustration of a variable power scope including a reticle of this invention.

The scopes of this invention include both fixed power and variable power (or "zoom") types. In FIG. 5 there is shown a diagram of the optics of a variable power scope of this invention. It will be noted that such scopes have both a front focal plane and a rear focal plane. Although there are definite advantages to positioning the reticles of this invention in the rear focal plane, as explained hereinafter, they can also be located at the front focal plane or any other focal plane, should there be any. It will be appreciated that when the reticle is located at the front plane, it must be inverted in comparison to the orientation shown in FIG. 5 since the image of the reticle will be inverted by the erector lens. Herein and in the appended claims, reference to the vertical relationship of portions of a reticle is meant to imply their apparent relationship as viewed through the scope.

When a reticle is situated at the front focal plane of a variable power scope, the cross hairs and apertures appear to increase in size with increasing power of magnification in the same proportion as the increasing target image size. However, the apparent angles subtended by lines of sight emanating from these reticle features remain constant. Thus, if a reticle configured for 18-inch targets is situated at the front focal plane of a variable power scope, the scope will remain configured for that target height (i.e., provide point-of-aim capability) regardless of the power setting.

Computer calculations have shown that a two-aperture reticle of this invention, of fixed dimensions, installed in a fixed power scope or situated at the front focal plane of a variable power scope can be used interchangeably and with good accuracy with a wide variety of cartridges encompassing virtually all of those commonly used for long range hunting of deer-size game. To adapt the scope for use with any given one of these cartridges the shooter need only use an appropriate 100 yd. sighting-in point, which differs for different cartridges. The use of differing sighting-in points is a means by which the differing trajectories associated with different cartridges can be made to be closely compatible with the fixed aperture/range/target height relationship implicit in a single fixed reticle of this invention. The calculations assumed a target $h$ of 18 inches, assumed the centers of the horizontal cross hairs to define the margins of the apertures, and assumed a model reticle having first and second apertures subtending 5.04 M.O.A. and 3.615 M.O.A., respectively, in a scope mounted with its axis 1½ inches above the axis of the rifle bore. Bullet trajectories were calculated using Ingalls' tables and typical values for muzzle velocity and ballistic coefficient. With this model reticle configuration, the first and second apertures bracket the image of an 18-inch high target located at ranges of 357 yds. and 498 yds. respectively. Referring to FIG. 16, the "first aperture window" is defined to be the 18-inch high vertical slit in space bracketed by the primary and second lines of sight at the range of 357 yds. (range $X_1$ in FIG. 16), and the "second aperture window" is defined to be the 18-inch high vertical slit in space bracketed by the second and third lines of sight at the range of 498 yds. (range $X_2$ in FIG. 16).

To match a given trajectory to the model reticle, a 100 yd. sighting-in point was chosen which minimizes the maximum deviation of the bullet trajectory from the centers of the aperture windows. (A trajectory perfectly matched to the model reticle configuration, according to the trajectory/line-of-sight relationship described above with respct to FIG. 4, would have a bullet trajectory path which passes exactly through the centers of both aperture windows.) This results in a bullet trajectory which generally passes slightly above the center of one aperture window and sightly below the center of the other aperture window as shown in FIG. 16, with the magnitudes of the two deviations from the centers of the aperture windows being equal. The magnitude of these deviations of the bullet trajectory from the centers of the aperture windows is a measure of the accuracy with which a given trajectory can be matched to a given reticle configuration and is termed the "impact error," measured in inches. The impact error is denoted to be positive in sign when the bullet trajectory passes above the center of the first aperture window and below the center of the second aperture window, and denoted to be negative in sign when the opposite occurs. The calculated 100 yd. sighting-in points (i.e., height of the bullet trajectory above the primary line of sight at 100 yds. range), impact errors and ranges where the bullet trajectory path crosses the second line of sight are given in Table I for cartridges with muzzle velocities ranging fron 2860 f.p.s. (0.308 Win.) to 3400 f.p.s. (0.300 Win. Magnum). It will be seen from Table I that the magnitudes of the impact errors are less than two inches for all cartridges listed, which is virtually negligible in comparison with the height of the target. (In terms of minute-of-angle error at the aperture windows, no impact errors exceed 0.55 M.O.A., which is better than the basic accuracy of most rifles.) Hence, it will be apparent that a fixed power scope (or a variable power scope with reticle installed at the front focus) containing a reticle of the present invention can be used interchangeably and with good accuracy for deer-sized targets on rifles firing bullets having widely differing trajectories.

TABLE I

| Cartridge | Bullet Weight (grains) | Ingalls Ballistic Coefficient (C) | Muzzle Velocity (f.p.s.) | 100 Yd. Sighting-in Point (inches) | Impact Error* (inches) | Range at Which Bullet Trajectory Crosses Second Line of Sight (yards) |
|---|---|---|---|---|---|---|
| .308 Win. | 150 | .387 | 2860 | +4.1 | +1.6 | 443 |
| 30-06 | 150 | .387 | 2970 | +3.3 | +0.7 | 443 |
| .270 Win. | 150 | .463 | 2900 | +3.2 | +0.2 | 442 |
|  | 130 | .395 | 3140 | +2.2 | −0.6 | 443 |
| 6.5 Rem. | 120 | .405 | 3030 | +2.8 | 0.0 | 443 |
| .243 Win. | 100 | .380 | 3070 | +2.7 | +0.1 | 443 |
| .300 Win. Mag. | 180 | .435 | 3070 | +2.3 | −0.6 | 443 |
|  | 150 | .387 | 3400 | +0.9 | −1.9 | 442 |
| 25-06 | 120 | .423 | 3100 | +2.2 | −0.7 | 443 |
| .264 Win. Mag. | 140 | .482 | 3200 | +1.3 | −1.7 | 442 |
| 7 mm. Rem. Mag. | 150 | .440 | 3260 | +1.2 | −1.7 | 442 |

*Deviation from centers of 18-inch targets positioned in aperture windows. "+" signifies bullet impact above center in first aperture window and below center in second aperture window. "−" signifies bullet impact below center in first aperture window and above center in second aperture window.

It will also be seen from Table I that all bullet trajectories cross the second line of sight at virtually identical ranges, i.e., 442–443 yds. Hence, it will be apparent that any cartridge of unknown trajectory (falling within the broad range of trajectories exemplified in Table I)

could be matched to the model reticle simply by sighting in the rifle/scope combination using the intersection of the vertical and second horizontal cross hairs as the aiming point to hit a sighting-in target located at a range of 422 yds. This is a very desirable feature which enables a shooter to "fine-tune" a rifle/scope combination to compensate for unknown variations in trajectory such as caused by differing barrel lengths, differing brands of ammunition, bullets of different ballistic coefficients, etc.

The vertical dimensions most appropriate for the apertures of a reticle of the present invention are obviously dependent upon the desired application. The data in Table I were compiled for a model reticle having dimensions chosen for use on deer-sized targets, to be used with a wide variety of popular hunting cartridges and using 100 yd. sighting-in points lying within a range of values commonly used by modern hunters. In examining other applications, it was found that the optimum ratio of the angles subtended by the first and second apertures, here denoted as R $(R=\theta_1/\theta_2)$, remained within a substantially limited range for all hunting applications considered. Within this limited range, the optimum value of R increases with increasing target height, increasing ballistic coefficient, decreasing muzzle velocity, and decreasing height of the 100 yd. bullet impact point with respect to the primary line of sight (i.e., sighting-in point). For applications including big game hunting (i.e., target heights from approximately 12 inches to 40 inches and rifles with muzzle velocities from 2000 f.p.s. to 3500 f.p.s. sighted in to place the bullet impact point from approximately 0 to 5 inches above the primary line of sight at 100 yds.) and varmint hunting (i.e., target heights from 3 inches to 14 inchs and rifles with muzzle velocities between 3000 f.p.s. and 4400 f.p.s. sighted in to place the bullet impact point from approximately ½ inch to 3 inches above the primary line of sight at 100 yds.), optimum values of R were found to remain in the range approximately between R=1.1 and R=1.9. For a scope designed specifically for a particular application, such as hunting of deer (i.e., 18-inch target height), optimum values of R lie within a smaller range of values of R.

The values desired for $\theta_1$ (from which $\theta_2$ can be determined, given R) can vary substantially. Optimum values of $\theta_1$ increase with increasing target height, with decreasing trajectory flatness, and with decreasing height of the 100 yd. bullet impact point with respect to the primary line of sight. Throughout the spectrum of possible values of $\theta_1$ there are narrower specific ranges of values that are best suited for specific purposes.

Thus, values of $\theta_1$ in the neighborhood of that used to compile the data of Table I are best suited for hunting of deer-sized animals with modern flat-shooting rifles. There is another range of values of $\theta_1$ which is particularly suited for the hunting of deer with rifles chambered for the popular 30—30 Winchester cartridge, which is less flat-shooting. Other ranges of $\theta_1$ values are optimum for varmint hunting, etc.

Table II lists ranges of R and $\theta_1$ values preferred for several applications. The most preferred ranges listed for deer hunting with common flat-shooting big game cartridges are appropriate for an assumed standard target height of 18 inches, with the lower margin of the first aperture and the upper margin of the second aperture assumed to be coincident (such as with the center of a horizontal cross hair separating the two apertures serving as the coincident margins, which is preferred as previously discussed), for use with cartridges and 100 yd. sighting-in heights encompassing approximately the ranges of values listed in Table I. The preferred ranges of R and $\theta_1$ listed in Table II for deer hunting with common flat-shooting big game cartridges encompass a wider variation of muzzle velocities (such as to include the slower 0.300 Savage cartridge and the ultra-fast wildcat magnums), encompass a moderate variation of the standard target height from the 18-inch high value to include nominally smaller and larger deer, encompass a wider range of 100 yd. sighting-in heights which, although not as commonly used, are still very effective for long-range shooting, and include a reticle wherein the lower and upper margins of the respective first and second apertures are vertically spaced apart by a height not exceeding approximately the lesser of (a) the difference in heights of the apertures, or (b) one fourth the height of the first aperture.

The second row in Table II lists ranges of R and $\theta_1$ values useful for hunting of deer with the popular 30—30 Winchester cartridge. Calculations have show that the effective aiming range of a preferred two-aperture reticle of the present invention configured for the trajectory of the 30—30 and deer is in excess of 350 yds. The most preferred values listed encompass the use of sighting-in heights ranging from approximately 1 to 3 inches above the primary line of sight at 100 yds., with both the 150 grain and 170 grain factory-loaded bullet weights, and assume the nominal target height value for deer to be between approximately 16 and 20 inches. The preferred values listed in Table II include the use of pointblank 100 yd. sighting in and the use of a reticle wherein the lower and upper margins of the respective first and second apertures are vertically spaced apart within the approximate limits just described for the prior application.

TABLE II

| Application | Most Preferred | | Preferred | |
|---|---|---|---|---|
| | R | $\theta_1$(M.O.A.) | R | $\theta_1$ (M.O.A.) |
| 1. Deer Hunting with Common Flat-Shooting Big Game Cartridges | 1.30 to 1.55 | 4.5 to 6.0 | 1.25 to 1.80 | 3.5 to 7.0 |
| 2. Deer Hunting with the 30-30 Winchester Cartridge | 1.35 to 1.65 | 6.5 to 9.0 | 1.25 to 1.80 | 6.0 to 11.0 |
| 3. Varmint Hunting with Flat-Shooting Cartridges | 1.15 to 1.45 | 1.5 to 4.0 | | |
| 4. Squirrel Hunting with .22 Rimfire Cartridges | 1.20 to 1.70 | 1.50 to 5.0 | | |
| 5. Military and Law Enforcement | | | 1.10 to 1.90 | 2.0 to 20.0 |

The values of R and $\theta_1$ listed in Table II for varmint hunting applications are appropriate for targets ranging in height from approximately 3 inches to 12 inches, with varmint cartridges having muzzle velocities exceeding approximately 3200 f.p.s., and sighted in to hit between approximately one and two inches above the primary line of sight at 100 yds. range.

The values of R and $\theta_1$ listed in Table II for squirrel hunting are applicable for use with 0.22 caliber rimfire rifles.

The application of a reticle of the present invention for military and law enforcement shooting encompasses many possible variations in trajectory, reference target height and sighting-in height. Trajectories range from those of standard military and law enforcement firearms to specialized flat-shooting rifles. The reference target height can range from that of a man's head (approximately 10 inches) to his erect height (approximately 70 inches). Thus the usable ranges of R and $\theta_1$ values are very broad, as indicated by the preferred values listed in Table II.

For reticles containing more than two target-spanning and aiming apertures in the manner of this invention (see FIGS. 1, 2), it will be apparent (i.e., from FIG. 4) that the vertical angle subtended by any aperture immediately subjacent another aperture will be less than the vertical angle subtended by the upper of the two apertures. Moreover, the ratio of the angles subtended by any two adjacent apertures (the ratio being defined as the angle subtended by the upper aperture divided by the angle subtended by the lower aperture of the adjacent two) will be less than the ratio of the angles subtended by another two adjacent apertures located superjacent the first two (i.e., referring to FIG. 4, the ratio $\theta_2/\theta_3$ will be less than the ratio $\theta_1/\theta_2$, etc.).

The scopes of this invention have combinations of features and advantages not possessed by any prior art scopes of which I am aware. One very important advantage is that the shooter need never estimate or calculate the actual range to a target. All the shooter need do is compare the target image size with one or more of the apertures and thereby immediately determine the proper aiming sight picture. Thus, the shooter need not understand the principles of bullet trajectories or memorize any trajectory information about the cartridge he is using.

Another advantage is that the substantially superjacent spacing of the target-spanning and aiming apertures in the preferred reticles of the present invention provides aiming points for ranges which differ substantially from those to which the apertures relate, i.e., a reticle with three apertures has seven distinct aiming points, etc. In some prior art scopes providing aperture-related aiming points, the shooter is required to utilize interpolation in aiming when the target is situated at ranges intermediate to those to which the target-spanning apertures relate (e.g., see U.S. Pat. No. 3,392,450).

Another advantage derived from the substantially superjacent aperture arrangement is that the maximum aiming error, when using only the most appropriate distinct aiming points with no interpolation, is invariant with range and always of sufficiently small magnitude to ensure that the bullet will strike the target. (Above it was shown that the maximum aiming error should not exceed approximately one-quarter of the target height when the most appropriate distinct aiming point is used, with no attempt to interpolate.) In some prior art scopes providing a plurality of aperture-related and/or range-related aiming points, the aiming points are so spaced apart that the difference in bullet drop (and hence the maximum aiming error) between successive aiming points varies (e.g., see U.S. Pat. No. 3,392,450) and grows larger with increasing range. In an embodiment of the latter patented invention such as described in the U.S. Pat. and in its commercial embodiment, the aiming points are distributed to relate to even increments in range (i.e., 200 yds., 300 yds., 400 yds., etc.); as a consequence, the difference in bullet drop between successive aiming points increases with increasing range, and so the maximum aiming error for targets situated at ranges intermediate to the aiming-point-related ranges also increases with increasing range, thus necessitating the use of interpolation in aiming at targets situated intermediate the more distant aiming-point ranges. The amount of interpolation required for targets situated at ranges intermediate to those to which its aiming points relate thus also increases with increasing range to the target. This need for interpolation may require time-consuming mental calculations and knowledge about the bullet's trajectory, and increases the likelihood of a miss. In contrast, the preferred reticle of the present invention provides an arrangement of distinct aiming points for which interpolation in aiming is not required to ensure a hit on the target, and for which the maximum aming error associated with use of only distinct aiming points is essentially invariant with range up to the maximum range for which aiming points are provided.

Another advantage of the preferred scopes of this invention is that the target-bracketing and aiming apertures are one and the same, such that no further rifle motion or separate aiming is required after conducting the target bracketing process. They are thus faster to use. Some prior art scopes (e.g., see U.S. Pat. No. 3,392,450) which have separate bracketing and aiming points require that the shooter realign the rifle and scope to the proper aiming point after conducting the target bracketing process. The latter are therefore slower to use.

Another advantage arising from the combined function of target-bracketing and aiming reticle elements in the present invention is that the reticle is less cluttered than in some prior art scopes providing point-of-aim capability (e.g., see U.S. Pat. No. 3,392,450). Prior art scopes in which the target-bracketing and aiming elements are separate require the use of more elements to provide a number of distinct aiming points equal to those of the present invention. Less reticle clutter is advantageous when fast, close-range shooting is done for which no range compensation is necessary.

Another very important advantage of a two-aperture embodiment of the preferred reticle of the present invention is the capability for accurately matching it with a rifle of which the trajectory is unknown (within a broad range of trajectories such as encompassed in Table I) by simply sighting in the rifle/scope combination such that the bullet trajectory path strikes the second line of sight at a specific range (e.g., see Table I and the "fine-tuning" process heretofore discussed).

Another advantage is that the shooter ordinarily need not make any scope adjustments while sighting on the target, and can therefore use both hands to steady his rifle. The scopes of this invention do not require any mechanically complex features not already used in conventional fixed and variable power scopes having no range-finding or point-of-aim capability.

Variable Power Embodiment Having Apertured Reticle Positioned at Ocular Focal Plane One major limitation of all prior art range finder and point-of-aim scopes of which I am aware is that they can be conveniently used for targets of only one height. If the height of the target of interest differs substantially from the target height for which the scope is designed, the shooter either cannot benefit from the scope's range-finding and/or point-of-aim capability or must indulge in calculations and interpolations to compensate for differing target heights. The preferred variable power scopes of this invention overcome this limitation and enable the shooter to make quick and convenient scope adjustments so as to maintain calculation-free point-of-aim capability over a wide range of target heights, e.g., 14 inches to 40 inches. They also enable a single scope to be adapted to a variety of different trajectories without the need for differing sighting-in heights. Certain variable power scope embodiments of the present invention, to be described later, also enable the shooter to make quick and convenient scope adjustments to compensate for trajectory variations such as those due to changes in bullet weight, ambient temperature, altitude, and firing angles. These capabilities are achieved by situating the reticle at the rear focus (i.e., ocular focal plane) of the variable power scope and providing indicator means (discussed in detail hereinafter) in association with the power varying mechanism of the scope. Since the reticle is situated rearwardly of the lens system that accomplishes the power variation within the scope, the apparent sizes of the cross hairs, apertures and other reticle features remain constant with varying power setting. In contrast, the sizes of target images viewed through the scope varying directly with the power of magnification. Consequently, the apparent angles subtended by the apertures decrease with increasing magnification and vice versa (i.e., the apparent relative height of an aperture relative to a target image height viewed through the scope decreases with increasing magnification). Thus, the angle ($\theta$) subtended by a recticle aperture changes according to the following relationship:

$$\frac{\theta}{\theta \text{ (min.)}} = \frac{P \text{ (max.)}}{P} \qquad (1)$$

where P is the power setting, $\theta$ is the apparent angle subtended by the aperture at power setting P, $\theta$ (min.) is the apparent angle subtended by the aperture at the maximum power setting, and P (max.) is the maximum power setting of the scope. (All elements of the reticle obviously remain in the same proportion to one another as the power setting is varied.) Thus, simply by varying the scope power setting, the apparent angle(s) subtended by the reticle aperture(s) can be adjusted to a plurality of values which can provide point-of-aim capability in the manner of this invention for a plurality of target heights and/or trajectories. To aid the shooter in selecting the proper power setting for a given target height and trajectory, it is preferred to provide a scale associated with the power varying mechanism. In FIG. 6, there is shown a partial schematic view of the exterior of a variable power scope having an apertured reticle (not shown) situated at the rear focal plane. The power ring 13 encircles the tubular body 15 of the scope. (In some scopes a rotating eyepiece assembly performs the function of the power ring.) As with conventional variable power scopes, the ring is turned to vary the power setting (here, from 3 to 9 power magnification). Removably secured to the power ring by screws 17 is a target height indicator (or "selector") plate 19. This plate is graduated for target heights of from 12 to 40 inches, with individual graduations 21 at 2-inch intervals. Spanning portions of the range of graduation are bands indicating a range of typical chest depths of four big game species; namely, antelope, deer, elk and moose. The target height indicator plate is calibrated for a specific trajectory and sighting-in point. In use, the shooter merely rotates the power ring so as to position pointer 23 opposite the indicator plate graduation appropriate to the target of interest and then aims and fires in the manner heretofore described in connection with FIG. 3a–3c. (Pointer 25 merely indicates the power of magnification as in conventional variable power scopes.)

When a single-aperture reticle located at the rear focus of a variable power scope is positioned such that the point of intersection of the primary horizontal cross hair and the vertical cross hair is coincident with the optical axis of the scope (i.e., the primary line of sight remains stationary relative to the bullet trajectory when the scope is rigidly affixed to the rifle as the power setting is varied; this is common practice in conventional variable power scopes having reticles containing only a single aiming point), the proper aperture angle $\theta_1$ (see FIG. 4) for a given target height is determined in the manner discussed in connection with FIG. 4. The corresponding scope power setting for each given target height can then be determined by equation (1), but can also be established by simply sighting at a target subtending the angle $\theta_1$ and varying the power setting until the aperture brackets that target. With a single-aperture embodiment, the point-of-aim capability is error-free for all target height settings within the target height range. That is, when a target of known height is located at a range such that its image height exactly spans the aperture when viewed through the scope, the power of which is set for the known target height and trajectory, the aiming sight picture of FIG. 3-b will cause the bullet to strike the vertical center of the target.

Assuming that only distinct aiming points are used, the "maximum effective aiming range" of a single aperture reticle as just described is analogous to the range of the second aperture window of FIG. 4, i.e., it is that range for which the aiming sight picture shown in FIG. 3c (used when the target image height appears to be smaller than the aperture height) will produce a hit on the lower edge of the target (i.e., a distance h/2 below the aiming point at the center of the target in FIG. 3c). Calculations for a rifle propelling a bullet of ballistic coefficient (C) of 0.406 at a muzzle velocity of 3200 f.p.s. (typical of a 0.270 Winchester cartridge hand-loaded with bullets weighing 130 grains) with the scope mounted with its axis 1½ inches above the bore line of the rifle and sighted in to place the bullet three inches above the primary line of sight at 100 yds. produced the characteristics listed in Table III.

A conventional point-blank aiming system having a single point-of-aim aligned with the center of a target has an analogous "maximum effective aiming range" equal to the ranges of the aperture window listed in Table III, i.e., the range at which the bullet has dropped a distance of $h/2$ below the single point-of-aim. It is evident from Table III that the single aperture embodiment just described provides an increase in maximum effective aiming range over that of a conventional scope of from 100 to more than 200 yds., depending on the target height of interest.

Features apparent from Table III are that the maximum

Table III

|  | Target Height (h) (inches) | | | | |
| --- | --- | --- | --- | --- | --- |
|  | 16 | 20 | 26 | 32 | 40 |
| Range to Aperture Window (yards) | 378 | 395 | 418 | 438 | 462 |
| Range at Which Bullet Trajectory Crosses Second Line of Sight (yards) | 459 | 487 | 526 | 559 | 601 |
| Range at Which Bullet Trajectory Has Dropped h/2 Below Second Line of Sight (yards), i.e., the Maximum Effective Range | 512 | 546 | 593 | 634 | 679 |
| Power Setting* (Magnification) | 7.23 | 6.04 | 4.91 | 4.19 | 3.54 |

*3 to 9 power range assumed, with $\theta_1$ (min.) equal to 3.4 M.O.A. and P (max.) equal to 9.

effective aiming range increases with increasing target height, and that higher magnifications are used with decreasing target heights. These features are advantageous and commensurate with other factors involved in long-range shooting (e.g., basic rifle accuracy and bullet dispersion characteristics as a function of range, and also the need for greater magnification of smaller targets to increase their resolution). These features are not possessed by any prior art scopes of which I am aware.

It will also be apparent (e.g., from FIG. 4) that the maximum effective aiming range provided by this embodiment increases with increasing flatness of the trajectory. Also, the magnification used with a target of a given height increases with increasing flatness of the trajectory and with the resultant increased ranges related to the reticle aiming points. Thus, this embodiment inherently possesses qualities commensurate with the use of flatter shooting rifles to gain greater effective range capability.

When a reticle having more than one target-spanning and aiming aperture is placed at the rear focus of a variable power scope, there usually will be only one target height for which there exists a scope power setting for which all aperture windows will be simultaneously free of error, i.e., which will relate to the trajectory exactly as in the manner shown in FIG. 4. This is because the ratio(s) of the angles subtended by the apertures ("ratio(s) of aperture angles") remains constant as the power of magnification is varied, whereas the ratio(s) of aperture angles required to exactly "match" a trajectory (i.e., in the manner of FIG. 4) varies slightly with changes in target height $h$. However, for most commonly used hunting cartridges, variations of the ratio(s) of the angles subtended by successive apertures needed to maintain exactly error-free sighting are negligibly small over a significant range of differing target heights $h$. Therefore, reticles having multiple apertures (e.g., those of the type shown in FIGS. 1–3) can be positioned at the rear focus of a variable power scope and will provide essentially error-free point-of-aim capability over a relatively wide range of target heights. (Here, "error-free" means that when the magnification is properly set for a given target height and trajectory, a target of the given height located at ranges where its image is exactly spanned by any of the apertures will be stuck essentially in the center when the shooter aims with the target bracketed by the aperture.) It will usually be desirable to use a reticle having apertures which will provide exactly error-free sighting for a target near or below the middle of the target height range across which point-of-aim capability is desired. (Choosng a target height near to the lower end of the range will provide greater accuracy for smaller targets for which less error can be tolerated, the important criteria being the ratio of the error to the height of the target area.)

Given a reticle configuration having suitable fixed ratios of aperture heights, power settings suitable for various target heights and trajectories can be readily computed in the following manner. The following assumes that a two-aperture reticle such as that shown in FIG. 10 is installed at the rear focus of a typical variable power scope such as depicted in FIG. 5. The point of intersection of the primary horizontal cross hair and the vertical cross hair coincides with the optical axis of the scope so that the position of the primary line of sight with respect to the body of the scope remains invariant with power setting as is common with telescopic sights having only a single horizontal cross hair. (As explained hereinafter, the primary line of sight need not be coincident with the optical axis.) The position of the center of the primary line of sight with respect to the bullet trajectory then remains invariant with power setting when the scope is rigidly affixed to a rifle. The relative orientation of the primary line of sight to the bullet trajectory is adjustable in the conventional manner so that the scope/rifle combination can be sighted in to produce a given orientation between the primary line of sight and the bullet trajectory. Referring now to FIG. 16, X is the distance traveled by the bullet ("range"). D(X) is the vertical deviation of the bullet trajectory from the center of the pimary line of sight at a range X, D(X) being positive in sign when the bullet trajectory is above the primary line of sight and negative when it is below. The rifle/scope combination will normally be sighted in to produce a small positive D(X) at relatively short ranges (e.g., +3 in. at X=100 yds.), thereby fixing the angular relationship between the primary line of sight and the bullet trajectory. The bullet trajectory function, D(X), which thus includes as parameters the sighting-in relationship and the offset of the scope above the bore line, can be determined from test firings or computed by methods such as Ingalls' Tables when the muzzle velocity and ballistic coefficient of the bullet are known. The respective lower and upper edges of the primary and second lines of sight define the first aperture, and the respective lower and upper edges of the second and third lines of sight define the second aperture. As explained previously, the apparent angles subtended by the first and second apertures ($\theta_1$ and $\theta_2$, respectively) vary inversely with power setting (magnification). The same is true of the angles $\tau_1$, $\tau_2$ and $\tau_3$ subtended by the cross hairs (here corresponding to the thicknesses of the primary, second and third lines of sight). Thus, the values of these angles at any power setting will be:

$$\theta_1 = \theta_1(\text{min.}) \cdot \frac{P(\text{max.})}{P}$$

$$\theta_2 = \theta_2(\text{min.}) \cdot \frac{P(\text{max.})}{P}$$

$$\tau_1 = \tau_1(\text{min.}) \cdot \frac{P(\text{max.})}{P} \quad (2)$$

$$\tau_2 = \tau_2(\text{min.}) \cdot \frac{P(\text{max.})}{P}$$

$$\tau_3 = \tau_3(\text{min.}) \cdot \frac{P(\text{max.})}{P}$$

where $\theta_1$ (min.), $\theta_2$ (min.), $\tau_1$(min.) $\tau_2$(min.) and $\tau_3$(min.) are the angles subtended at the highest power setting P(max.). Defining R to be the ratio $$R = \frac{\theta_1}{\theta_2}, \quad (3)$$

R remains constant with changing power setting. Given a target height, $h$, there can be defined an "aperture window" to exist between each pair of lines of sight. These are vertical slices of space, between the lines of sight as shown in FIG. 16, located at the ranges where the vertical distance between the edges of the lines of sight is equal to $h$. The ranges to the aperture windows, $X_1$ and $X_2$, are given by $$X_1 = 100 \cdot \frac{h}{\theta_1} \text{ and } X_2 = 100 \cdot \frac{h}{\theta_2} \quad (4)$$

where $h$ is expressed in inches, $X_1$ and $X_2$ in yards, and $\theta_1$ and $\theta_2$ in M.O.A. The ranges to the aperture windows vary with power setting according to the relationships given by equations (2) and (4).

Deviations of the bullet trajectory above or below centers of the aperture windows are termed the "aperture window impact errors," $E_1$ and $E_2$, the subscript 1 denoting the first aperture window and the subscript 2 denoting the second aperture window, as shown in FIG. 16. $E_1$ and $E_2$ are measured in inches and defined to be positive when the bullet trajectory passes above the center of an aperture window and negative when it passes below. Ideally, $E_1$ and $E_2$ should both be zero for each target height, $h$, across the target height range of interest (i.e., when $E_1$ and $E_2$ are zero the target-spanning and aiming apertures relate to the trajectory exactly as in the manner shown in FIG. 4). However, as explained previously, given a telescopic sight of aforementioned design having fixed ratios of the reticle elements, together with an arbitrary bullet trajectory oriented in a predetermined manner with respect to the primary line of sight, there generally do not exist power settings for which the aperture window impact errors can be zero simultaneously in both aperture windows over a range of target heights and corresponding power settings. Nevertheless, by proper choice of power setting (i.e., in calibration) for each target height $h$, the aperture window impact errors can be minimized to such an extent that they are negligible in comparison to the target height, assuming that a suitable value for R is utilized in the reticle.

The process of calibration of a target height indicator plate such as shown in FIG. 6 for a given trajectory function D(X) becomes one of determining for each target height graduation a power setting for which the aperture window impact errors will be minimized according to some specific criterion. The criterion used in the following procedure involves the specification of the desired ratio of aperture window impact errors, $$\frac{E_2}{E_1},$$

from which a specific calibration and the magnitudes of the resulting aperture window impact errors can be determined. The resulting magnitudes of $E_1$ and $E_2$ can then be examined a posteriori to determine whether the specified ratio of $$\frac{E_2}{E_1}$$

produced acceptably small aperture window impact errors.

The specified ratio of aperture window impact errors is defined to be T, where $$T = \frac{E_2}{E_1} \quad (5).$$

Given a target height $h$, a reticle geometry and a function D(X) describing the bullet trajectory, a setting of the power adjusting mechanism producing a desired value of T can be determined by a method of successive approximation, beginning with an initial "guess" for the power setting, determining the subsequent aperture window impact errors $E_1$ and $E_2$, and then "updating" the power setting in an iterative sequence until the desired value of T is reached.

It is convenient to use as an initial guess that setting which produces no impact error at the first aperture window. This setting can be found by solving the equation $$D(X_1) = -\frac{h}{2} \left[ 1 + \frac{\tau_1(\text{min.})}{\theta_1(\text{min.})} \right] \quad (6)$$

for $X_1$, the range to the first aperture window. Having found $X_1$, the corresponding values for $\theta_1$, P, etc., follow from equations (2) through (4), i.e., $$\theta_1 = \frac{100}{X_1} \cdot h \qquad X_2 = 100 \cdot \frac{h}{\theta_2}$$

$$\theta_2 = \frac{\theta_1}{R} \qquad P = \frac{\theta_1(\text{min.})}{\theta_1} \cdot P(\text{max.}). \quad (7)$$

Equation (6) is implicit in the variable $X_1$ and can be solved by Newton's method, which is essentially an iteration procedure.

Equations (8) and (9) give the impact errors at the two aperture windows:

$$E_1 = \frac{h}{2} \left[ 1 + \frac{\tau_1(\text{min.})}{\theta_1(\text{min.})} \right] + D(X_1) \quad (8)$$

$$E_2 = h \cdot R \left[ 1 + \frac{1}{2} \left( \frac{1}{R} + \frac{\tau_1(\min.)}{\theta_1(\min.)} \right) + \frac{\tau_2(\min.)}{\theta_2(\min.)} \right] + D(X_2) \qquad (9).$$

The ratio of $E_2$ divided by $E_1$ as computed from equations (8) and (9) is compared with the desired value, T. If the computed ratio is not within an acceptably small tolerance of the desired value, T, then the power setting must be updated.

An updated power setting which is closer to the desired value can be found in the following manner. The bullet trajectory in the neighborhood of each aperture window range, $X_1$ and $X_2$, is approximated locally by straight lines tangent to the bullet trajectory at $X_1$ and $X_2$. The slopes of these tangent lines can be computed by finite difference as $$\left. \frac{dD(X)}{dX} \right|_{X=X_1} = \frac{D(X_1+5) - D(X_1-5)}{10} \qquad (10)$$

$$\left. \frac{dD(X)}{dX} \right|_{X=X_2} = \frac{D(X_2+5) - D(X_2-5)}{10} \qquad (11)$$

This leads to simple explicit analytic approximations to the bullet trajectory in the neighborhoods of the aperture window ranges. By considering the updated power setting (which is equivalent to considering the updated $\theta_1$ value) to be a small perturbation from its former value and retaining only lowest order terms in the ensuing analysis, the following equation can be derived for the updated value of $\theta_1$:

(12) $\theta_1(\text{updated}) = (1-\epsilon) \cdot \theta_1(\text{previous value})$ where $$\epsilon = \frac{h \cdot R \left[ 1 + \frac{1}{2} \left( \frac{1}{R} + \frac{\tau_1(\min.)}{\theta_1(\min.)} \right) + \frac{\tau_2(\min.)}{\theta_1(\min.)} \right] + D(X_2) - T}{X_1 \cdot T \cdot \left. \frac{dD(X)}{dX} \right|_{X=X_1} - X_2 \cdot \left. \frac{dD(X)}{dX} \right|_{X=X_2}} \left[ \frac{h}{2} \left( 1 + \frac{\tau_1(\min.)}{\theta_1(\min.)} \right) + D(X_1) \right] \qquad (13)$$

This updated value for $\theta_1$ is used to replace the initial guess, and the calculations repeated until the ratio of $E_2$ divided by $E_1$ as calculated from equations (8) and (9) converges to a value acceptably close to T. It is found that the process normally converges very close to the desired value of T within a few iterations. The computed values of $\theta_1$, $\theta_2$ and P from the last iteration become the calibrated values. The values of $E_1$ and $E_2$ provided by equations (8) and (9) in the last iteration give the values of the aperture window impact errors for the calibration. These can be examined a posteriori to determine whether the choice for T gave a calibration for which the aperture window impact errors are acceptably small. Hereinafter it will be shown that there do exist choices for T which, in combination with suitable values of R, produce aperture window impact errors that are acceptably small over a wide range of target heights and bullet trajectories.

(It will be noted that the power setting P need not be known to establish a calibration of the power setting means. The important parameter for which a proper setting must be accurately established is the apparent angle subtended by an aperture. This can be established by aiming the scope at a target subtending the proper angle [i.e., $\theta_1$ as determined from the preceding analysis] and varying the power adjustment means until the aperture is seen to exactly bracket the target.)

It should be noted that the foregoing equations were derived on the assumption that a shooter would use the near edges of the cross hairs in the target bracketing process required in aiming. That is not the only available choice for the aperture margins. If, for example, the scope were to be calibrated under the assumption that a shooter would use the centers of the cross hairs for the target bracketing comparisons required in aiming (this is preferred, for reasons heretofore discussed), foregoing the foregoig equations can be used to provide that calibration by setting $\tau_1(\min.)$, $\tau_2(\min.)$ and $\tau_3(\min.)$ equal to zero and redefining R to be measured from the centers of the cross hairs.

T can be selected to produce calibrations meeting a number of different criteria. For example, selection of T equal to infinity produces a calibration giving zero error in the first aperture window. A rationale for such a selection could be that hunters are likely to shoot more frequently at ranges closer to that of the first aperture window than that of the second, and therefore it would be advantageous to have less error at the first aperture window than at the second. Alternately, selection of T equal to $-1$ gives aperture window impact errors that are of equal magnitude in the aperture windows but of opposite sign, i.e., the bullet trajectory passes above the center of one aperture window and below the center of the other as shown in FIG. 16. This latter selection corresponds to a condition where the maximum aperture window impact error is minimized, since any deviation from the power setting corresponding to T equal to $-1$ will cause the magnitude of the aperture window impact error in one of the two aperture windows to increase. This selection (T = $-1$) also produces a bullet trajectory crossing of the second line of sight approximately midway in range between the two aperture windows (see FIG. 16). With a proper choice of reticle geometry, T = $-1$ was found a posteriori to produce acceptably small impact errors at both aperture windows over a wide range of target heights and trajectories. Hence the specification of T equal to $-1$ was found to be a good criterion for producing calibrations that matched the aiming system with the bullet trajectory, such that the aiming sight pictures of FIGS. 3a–c would produce hits in the vital target area. Another good set of criteria may encompass a variation of T with target height, with T chosen to produce smaller errors at the first aperture window relative to the second (i.e., T<$-1$) as target height increases, under the assumption that little or no shooting would be done at the largest game animals at the extreme ranges that exist at the second aperture window. The principles involved in the calibration procedures described herein for a two-aperture reticle embodiment can obviously be extended to reticle configurations having more than two apertures.

Calculations have shown that a variable power scope of this invention having approximately a factor-of-three variation in magnification capability (e.g., 3X – 9X or 2.3X – 6.9X magnification ranges, which are common to existing variable power scopes) and having a single two-aperture reticle of this invention installed at the rear focus will provide a trajectory-compensating aiming system that can be used with good accuracy for a range of target heights (e.g., 14 to 40 inches) encompassing all of the more abundant North American big game animals, and capable of being used in this capacity with virtually all modern high velocity rifles ranging in muzzle velocity from that of the 0.300 Savage to the fastest commercial magnums by simply utilizing the power setting indicated by a target height indicator plate calibrated for the trajectory of interest. Table IV lists the impact errors calculated for various cartridges for the range of target heights from 14 inches to 40 inches, all with a single reticle having a ratio of aperture heights R=1.392 and calibrated according to the criterion T = −1. (The expression "impact error," as used here and hereinafter, denotes the aperture window impact errors which are equal in magnitude when T = −1. The impact error is assigned a positive value when the aperture window impact error is positive at the first aperture window and negative at the second, and is assigned a negative value when the opposite prevails.) The calculations assumed the centers of the cross hairs to define the margins of the apertures, assumed the primary line of sight to be located coincident with the optical axis, with the scope mounted with its axis 1½ inches above the axis of the rifle bore, with all scope/rifle combinations sighted in to place the bullet trajectory 3 inches above the center of the primary line of sight at 100 yds. range, and utilized bullet trajectories calculated from Ingalls' tables using published standard muzzle velocities and bullet ballistic coefficients estimated from those published in *Sierra Bullets Reloading Manual*, (The Leisure Group, Inc. 1971) and *Speer Manual for Reloading Ammunition*, (Lawton Printing, Inc. 1961).

It will be apparent from Table IV that the impact errors for 18-inch high target animals (i.e., deer, the most common big game target) do not exceed eight-tenths of an inch for any cartridge listed. Thus, it will be apparent that a single scope containing a two-aperture reticle of the present invention installed at the rear focus can be adapted with good accuracy to a wide variety of trajectories simply by setting the power adjustment means to appropriately calibrated settings.

The variations of impact error with target height will be seen from Table IV to be similar for all cartridges and range from slightly positive values for the smallest targets to greater negative values for the largest targets. The magnitudes of all impact errors, for all cartridges, remain less than eleven percent of the target height over the entire range of target heights listed. Thus, it will be apparent that a two-aperture embodiment of the present invention, calibrated according to procedures such as heretofore described, will provide an accurate and practically useful point-of-aim capability over a wide range of target heights.

Table V shows calculated power settings (magnifications) for the scope configuration assumed in Table IV (i.e., R=1.392, etc.), assuming the scope to have a magnification range from 3-power to 9-power and assuming the absolute size of the reticle to be such that $\theta_1(\min.)=3.4$ M.O.A. at P(max.). It will be apparent from Table V that a single scope capable of a factor-of-three power variation can be used with the heretofore described reticle configuration over the entire target height and trajectory range encompassed in Table IV.

Table VI shows the calculated ranges to the aperture windows and to the points where the bullet trajectory crosses the second and third lines of sight for the 0.300 Savage and the 0.300 Winchester Magnum cartridges listed in Tables IV and V (with bullets weighing 150 grains), assuming the same scope and sighting-in configuration used therein. It will be apparent from Tables V and VI that a single two-aperture reticle of the present invention installed at the rear focus of a variable power scope provides greater magnification and longer aiming range capability as the rifle's trajectory increases in flatness for any given target height, and that greater maximum aiming range capability is provided for larger targets. These are advantages not possessed by any prior art scopes of which I am aware.

TABLE IV

| Cartridge | Bullet Weight (grains) | Ingalls Ballistic Coefficient (C) | Muzzle Velocity (f.p.s.) | Target Heights (inches) | | | | | |
|---|---|---|---|---|---|---|---|---|---|
| | | | | 14 | 18 | 22 | 28 | 34 | 40 |
| | | | | Impact Error (inches) | | | | | |
| .243 Win. | 100 | .445 | 3070 | +.8 | +.2 | −.4 | −1.3 | −2.3 | −3.2 |
| .270 Win. | 130 | .406 | 3140 | +1.0 | +.4 | −.2 | −1.1 | −1.9 | −2.9 |
| | 150 | .483 | 2900 | +.6 | −.1 | −.7 | −1.7 | −2.7 | −3.7 |
| .270 Weatherby Mag. | 130 | .395 | 3375 | +1.3 | +.8 | +.2 | −.6 | −1.5 | −2.2 |
| | 150 | .463 | 3245 | +1.0 | +.4 | −.2 | −1.2 | −2.1 | −3.0 |
| 7 mm. Rem. Mag. | 150 | .440 | 3260 | +1.1 | +.5 | −.1 | −1.1 | −2.0 | −2.9 |
| | 175 | .550 | 3070 | +.7 | −.1 | −.7 | −1.8 | −2.8 | −3.9 |
| .300 Savage | 150 | .409 | 2670 | +0.5 | −0.1 | −0.8 | −1.8 | −2.8 | −3.8 |
| 30-06 | 150 | .409 | 2970 | +.8 | +.2 | −.4 | −1.3 | −2.3 | −3.2 |
| | 180 | .501 | 2700 | +.4 | −.3 | −1.0 | −2.1 | −3.1 | −4.2 |
| .300 Win. Mag. | 150 | .409 | 3400 | +1.3 | +.8 | +.2 | −.7 | −1.5 | −2.4 |
| | 180 | .501 | 3070 | +.7 | +.1 | −.6 | −1.6 | −2.6 | −3.6 |
| .338 Win. Mag. | 200 | .375 | 3000 | +.9 | +.3 | −.2 | −1.1 | −2.0 | −2.9 |
| | 275 | .482 | 2600 | +.3 | −.3 | −1.0 | −2.1 | −3.2 | −4.3 |

TABLE V

| Cartridge | Bullet Weight (grains) | Ingalls Ballistic Coefficient (C) | Muzzle Velocity (f.p.s.) | Target Heights (inches) | | | | | |
|---|---|---|---|---|---|---|---|---|---|
| | | | | 14 | 18 | 22 | 28 | 34 | 40 |
| | | | | Power Setting* (magnification) | | | | | |
| .270 Win. | 130 | .406 | 3140 | 7.72 | 6.39 | 5.51 | 4.62 | 4.02 | 3.58 |
| .300 Savage | 150 | .409 | 2670 | 6.55 | 5.43 | 4.70 | 3.96 | 3.45 | 3.08 |
| 7 mm. Rem. Mag. | 175 | .550 | 3070 | 7.88 | 6.54 | 5.65 | 4.76 | 4.15 | 3.71 |
| .300 Win. Mag. | 150 | .409 | 3400 | 8.41 | 6.95 | 5.98 | 5.01 | 4.35 | 3.88 |

*Power range from 3 to 9; $\theta_1$(min.)=3.4 M.O.A.; R=1.392; cross hair centers define the aperture margins, rifles sighted in 3 inches above primary line of sight at 100 yds.

TABLE VI

| Cartridge | Ranges (yards) | Target Height (inches) | | | | | |
|---|---|---|---|---|---|---|---|
| | | 14 | 18 | 22 | 28 | 34 | 40 |
| .300 Savage, 150 grain bullet, C = .409, Muzzle Velocity = 2670 fps. | Range to First Aperture Window | 300 | 320 | 338 | 362 | 383 | 403 |
| | Range at which Bullet Trajectory Crosses Second Line of Sight | 370 | 396 | 418 | 448 | 475 | 499 |
| | Range to Second Aperture Window | 417 | 445 | 471 | 504 | 534 | 560 |
| | Range at which Bullet Trajectory Crosses Third Line of Sight | 455 | 493 | 526 | 569 | 607 | 643 |
| .300 Win. Mag., 150 grain bullet, C = .409, Muzzle Velocity = 3400 fps. | Range to First Aperture Window | 385 | 409 | 430 | 459 | 484 | 507 |
| | Range at which Bullet Trajectory Crosses Second Line of Sight | 476 | 506 | 533 | 569 | 600 | 629 |
| | Range to Second Aperture Window | 536 | 569 | 599 | 639 | 673 | 705 |
| | Range at which Bullet Trajectory Crosses Third Line of Sight | 574 | 618 | 657 | 708 | 752 | 792 |

Another feature of this embodiment is the simple capability to "fine-tune" a scope/rifle combination to compensate for departures from the "standard" trajectory for which the indicator plate was calibrated (departures such as caused by differing barrel lengths, chamber and rifle bore tolerances, brand of ammunition, etc.). "Fine-tuning" can be accomplished by ignoring the "standard" sighting-in height (e.g., 3 inches high at 100 yds. in the examples given heretofore) and using instead a sight setting which produces, at long ranges, a bullet path which more nearly approximates the "standard" used for the calibration. This can be accomplished by selecting a power setting corresponding to a target height midway between the extremes on the indicator plate (or nearer to either extreme if the shooter is particularly interested in small or large target heights) and fine-tuning as described heretofore for the fixed power embodiments of this invention by sighting in the rifle/scope combination such that the bullet trajectory intersects the second line of sight at the range at which a "standard" trajectory would intersect the second line of sight, this range having been provided by the scope manufacturer.

It will be appreciated that the values of R and $\theta_1$ (min.) relevant to the data presented in Tables IV–VI (i.e., R=1.392, $\theta_1$ (min.)=3.4 M.O.A.) are not the only values of practical use. These values were selected for a particular range of application in a scope of particular capability, namely for use with most modern hunting cartridges, for a target height range encompassing North American big game animals, using a sighting-in height placing the bullet 3 inches above the primary line of sight at 100 yds., and embodied in a scope capable of a factor-of-three power variation.

Changes in these parameters lead to corresponding changes in the most desired values for R and $\theta_1$ (min.).

For example, if a sighting-in height placing the bullet trajectory coincident with the primary line of sight at a range of 100 yds. is used, then a more appropriate value for R is found to be in the neighborhood of R=1.66. Table VII lists the impact errors (using T=−1 in the calibration procedure) calculated for several cartridges and target heights using a two-aperture reticle having a ratio of aperture heights R=1.663 and assuming a sighting-in height placing the bullet trajectory coincident with the primary line of sight at a range of 100 yds., with the scope mounted with its axis 1½ inches above the axis of the rifle bore and assuming the centers of the cross hairs to define the margins of the apertures. It will be apparent from Table VII that the impact errors for this configuration are, on the average, even smaller over the entire target height range than those for the configuration assumed for Table IV. A configuration such as that assumed for Table VII for which the impact errors remain smaller over the target height range would be particularly advantageous for use with reticles embodying additional (i.e., more than two) target-spanning and aiming apertures and designed for use over a broad range of target heights and/or trajectories. However, one disadvantage of the configuration of Table VII as compared with that of Table IV is that its lower 100-yd. sighting-in height reduces, for most big game hunting applications, the point-blank aiming range over which trajectory compensation in aiming need not be considered for practical purposes. This is a disadvantage which probably outweighs, for a two-aperture reticle embodiment, the advantage of reduced impact error, since it is not necessary for practical purposes to minimize the impact errors but only to insure that they remain a small fraction of the target's height.

TABLE VII

| Cartridge | Bullet Weight (grains) | Ingalls Ballistic Coefficient (C) | Muzzle Velocity (fps) | Target Heights (inches) | | | | | |
|---|---|---|---|---|---|---|---|---|---|
| | | | | 14 | 18 | 22 | 28 | 34 | 40 |
| | | | | Impact Error (inches) | | | | | |
| .243 Win. | 100 | .445 | 3070 | +.10 | −.08 | −.28 | −.57 | −.87 | −1.13 |
| .270 Win. | 130 | .395 | 3140 | +.19 | +.05 | −.13 | −.34 | −.52 | −.67 |
| | 150 | .463 | 2900 | +.08 | −.13 | −.36 | −.70 | −1.03 | −1.31 |
| .270 Weatherly Mag. | 130 | .395 | 3375 | +.24 | +.10 | −.05 | −.22 | −.40 | −.55 |
| | 150 | .463 | 3245 | +.11 | −.09 | −.34 | −.66 | −.92 | −1.22 |
| 7 mm. Rem. Mag. | 150 | .440 | 3260 | +.13 | −.06 | −.27 | −.52 | −.79 | −1.00 |
| | 175 | .550 | 3070 | −.03 | −.32 | −.57 | −1.03 | −1.40 | −1.81 |
| .300 Savage | 150 | .409 | 2670 | +.26 | +.06 | −.12 | −.41 | −.69 | −.95 |
| 30-06 | 150 | .409 | 2970 | +.17 | +.01 | −.20 | −.42 | −.64 | −.86 |
| | 180 | .501 | 2700 | +.07 | −.17 | −.42 | −.78 | −1.14 | −1.55 |
| .300 Win. Mag. | 150 | .409 | 3400 | +.19 | +.04 | −.12 | −.32 | −.53 | −.67 |
| | 180 | .501 | 3070 | +.02 | −.20 | −.48 | −.82 | −1.17 | −1.52 |
| .338 Win. Mag. | 200 | .375 | 3000 | +.26 | +.13 | −.02 | −.22 | −.38 | −.53 |
| | 275 | .482 | 2600 | +.13 | −.09 | −.31 | −.67 | −1.09 | −1.43 |

The parameters most strongly influencing the choice for R are (1) sighting-in height and (2) the range of target heights of interest. As the sighting-in height at 100 yds. range decreases, the optimum value for R increases. As the average height within the range of target heights decreases (e.g., such as for a scope designed primarily for varmint hunting, i.e., crows, chucks, etc., instead of big game), the optimum values for R decrease. Increasing muzzle velocities also are best accompanied by decreasing values of R; increasing ballistic coefficients of bullets are best accompanied by increasing values of R. The range of values of R that are most useful for the types of hunting applications discussed herein is limited, and it will generally be desired that values of R remain in the range approximately between R=1.1 and R=1.9, the range between approximately R=1.25 and R=1.90 being preferred for a scope designed for hunting of big game, and the range between approximately R=1.10 and 1.45 being preferred for the hunting of varmints. (The same considerations apply to reticles containing more than two apertures; for these, R is defined to be the ratio of the height of the first aperture divided by the height of the second aperture.)

The optimum choice for $\theta_1$ (min.) is governed primarily by the combination of the flattest trajectory and smallest target height to be accommodated, the objective being to select $\theta_1$ (min.) so as to utilize essentially the highest power setting within the magnification range available, which occurs with this combination of trajectory and target height. $\theta_1$ (min.) can vary widely, depending most strongly on the range of target heights of interest. It will generally be desired that for a scope designed for general hunting of North American big game animals with currently popular long range cartridges, $\theta_1$ (min.) will remain in the range of from about 2.5 M.O.A. to about 5.5 M.O.A. For varmint hunting it will generally be desired that $\theta_1$ (min.) will remain in the range of from about 1.0 M.O.A. to 3.0 M.O.A. Other ranges of $\theta_1$ (min.) values will generally be desired for other applications.

Embodiments of apertured reticles located at the rear (ocular) focus of a variable power scope and positioned such that the primary horizontal cross hair is aligned with the optical axis (i.e., such that when a scope is firmly fixed to a rifle the relationship of the primary line of sight to the bullet trajectory does not vary with changing power setting) have been discussed and are preferred. However, the present invention also contemplates apertured reticles located at the rear focus of variable power scopes wherein the primary horizontal cross hair is displaced vertically from the optical axis. Such configurations offer certain advantages presently to be described. If the primary horizontal cross hair is positioned so as to project a line of sight below the optical axis, the apparent angle between the primary line of sight and the optical axis will increase with decreasing power setting when the reticle is positioned at the rear focus. When such a scope is rigidly attached to a rifle, the effect will be that the elevation of the bullet trajectory relative to the primary line of sight will increase with decreasing scope power setting, i.e., the bullet impact point at 100 yards relative to the primary line of sight will be higher at lower power settings than at higher settings. This effect can be used to reduce the variation of impact error with target height encountered with multiple apertured reticles. For the configuration associated with Table IV (where the primary cross hair was assumed to be coincident with the optical axis), impact error becomes more negative as target height increases, which means that R (which is fixed) becomes increasingly smaller than the "most desirable R" as the target height increases over the upper part of the target height range. But, as previously discussed, increases in the 100-yard sighting-in height lead to smaller most desirable R values. Hence, a reticle embodiment wherein the primary horizontal cross hair projects a line of sight below the optical axis (which produces, in effect, an increasing 100-yard sighting-in height with decreasing power setting, i.e., with increasing target height), can be used to reduce the variation in most desirable R values over the target height range and hence to reduce the magnitude of the impact error variation with varying target heights. Calculations for a 0.270 Winchester cartridge show that when the primary horizontal cross hair of a properly dimensioned, two-aperture reticle of the present invention installed at the rear focus is positioned such that the primary line of sight lies approximately 2.6 M.O.A. below the optical axis at the maximum power setting of a variable power scope capable of a factor-of-three power variation, the impact error can be essentially zero over the entire range of 14 to 40-inch high targets when calibrated using procedures similar to those heretofore discussed. Other advantages of this embodiment are that it decreases the magnification range needed to accommodate a given range of target heights and hence extends the range of target heights that can be accommodated within a limited scope power variation range. The reduction in impact error capability also makes this embodiment attractive for use with reticles having more than two apertures. This embodiment also serves to widen the spread in maximum effective ranges between small and large targets. One disadvantage is that for close range shooting, the shooter loses the flexibility to be able to utilize any power setting for quick, point-blank aiming. He would usually be restricted to using only a small range of power settings for effective, point-blank aiming since the position of the bullet trajectory path relative to the primary line of sight would change significantly with power setting.

Positioning the primary horizontal cross hair of a reticle of the present invention installed at the rear focus of a variable power scope such that the primary line of sight lies above the optical axis produces opposite effects and is subject to the same disadvantage noted above. One advantage that can be gained for most hunting situations is that greater maximum effective aiming range can be obtained for small targets (since the 100-yard bullet impact point relative to the primary line of sight is higher at the higher power settings used for smaller targets) when retaining a sighting-in relationship providing good point-blank aiming capability (e.g., with the trajectory path approximately three inches above the primary line of sight at 100 yards range) at the lowest scope power setting. It generally will be desired that the maximum deviation of the primary horizontal cross hair from the optical axis, either above or below, will not exceed approximately twice the height of (i.e., angle subtended by) the target-spanning and aiming aperture immediately subjacent the primary cross hair. For reticles installed at the front focus of a variable power scope these variations do not apply since the reticle is magnified in the same proportion as the target and the angles subtended by the lines of sight are invariant with power setting.

It will be apparent from the data presented in Tables IV–VI that the preferred variable power scopes of the present invention can be quickly and conveniently adjusted for pluralities of target heights and/or trajectories simply by setting the power ring to an appropriate magnification. Referring to FIG. 7, the target height indicator (or "selector") plate 51 is located adjacent the power ring 52, there being one pointer 53 for indicating the power setting and a second pointer 54 for selecting a target height and bullet weight. The plate differs from that of the embodiment shown in FIG. 6 in that it accommodates three different trajectories corresponding to three different bullet weights. To employ the indicator plate, the shooter turns the power ring to align the pointer 54 with the intersection of the appropriate bullet weight and target height lines. Calibrations for different trajectories can be determined by utilizing the D(X) function appropriate for each trajectory in the calibration procedure discussed previously.

The aerodynamic drag force acting on a bullet in flight varies directly with air density, which in turn varies with altitude. Lower air densities (higher altitudes) produce the same effect on the trajectory as increasing the ballistic coefficient. At short ranges where bullet drop is dominated by muzzle velocity, the effect of altitude on the trajectory is insignificant. But at long ranges, the effect can be substantial. The lower aerodynamic drag experienced in the thinner air at high altitudes makes a bullet shoot flatter at long ranges. With the variable power scopes of this invention, the altitude effects can be easily compensated for merely by incorporating an altitude scale on the calibration plate such as shown in FIG. 8. (It will be noted that such a scale is premised on the assumption of nominal values of temperature, barometric pressure and humidity, which also affect the air density.) To compensate for altitude, the shooter need only set the power ring 55 such that the appropriate pointer 56 or 57 is aligned with the intersection of the target height and altitude lines of interest on the appropriate indicator plate 58 or 59. It will be noted that the two indicator plates 58 and 59 are for different bullet weights (130 grains and 150 grains), and that both provide for altitude compensation. It will also be apparent that the altitude delineations on the indicator plates could be replaced by delineations of atmospheric pressure. (The calculation of calibrations related to different atmospheric conditions can be determined in the manner heretofore described by utilizing appropriate values of the ballistic coefficient in the determination of the D(X) function; see *Sierra Bullets Reloading Manual* [The Leisure Group, Inc., Santa Fe Springs, California, 1971, pages 246–248] for a more detailed description of the effects of atmospheric conditions on ballistic coefficients.)

Figure 13:
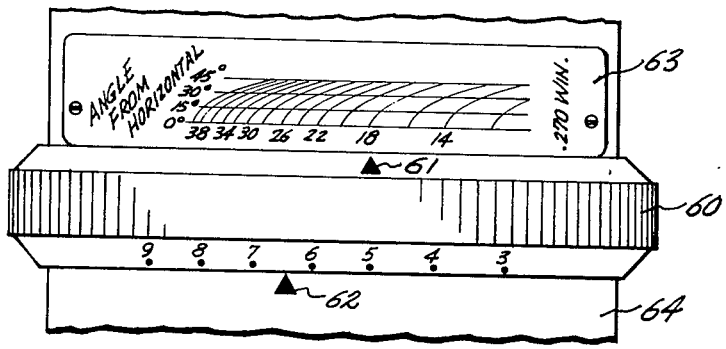

Another factor which will affect a bullet's trajectory is the deviation of angle of fire from horizontal. If the rifle is angled upwardly or downwardly from the horizontal, the bullet drop at any range will be decreased as compared to the bullet drop at that range when the rifle is horizontal when fired. Thus, deviations from horizontal fire effectively cause a flattening of the bullet trajectory. As in the embodiment shown in FIG. 13, this effect can be readily compensated for by provision of a suitable indicator plate. In FIG. 13, there is depicted a rotatable power ring 60 and two pointers 61 and 62, the former being located on the power ring and directed toward the target height-angle from horizontal fire indicator plate 63 and the latter being located on the scope body 64 and directed toward the magnification scale on the power ring. To utilize the embodiment of FIG. 13, the power ring 60 is merely rotated to align the pointer 61 with the intersection of the target height and angle from horizontal lines of interest on the indicator plate 63.

Figure 15:
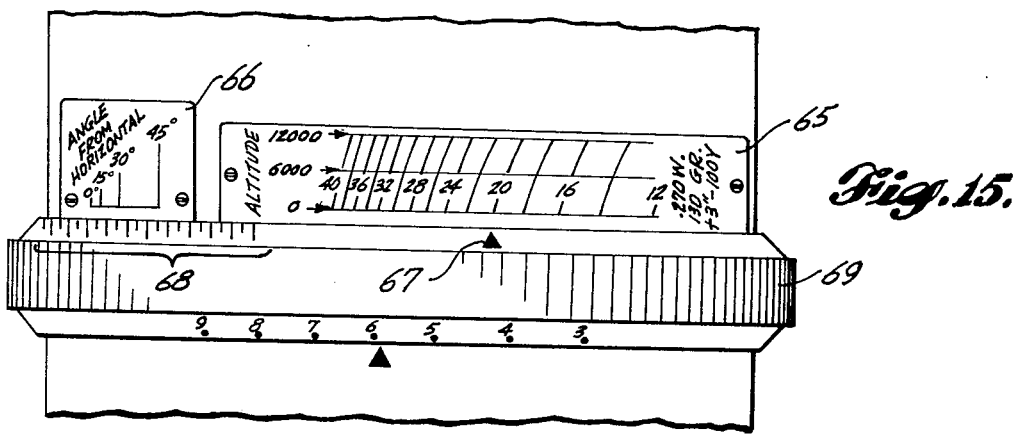

It will be seen from FIG. 13 that the increment in turning angle of the power ring needed to compensate for any given angle from horizontal is essentially invariant with target height (i.e., the power ring turning angle increment between 0° and 45° angle from horizontal for 40-inch high targets is essentially the same as for 14-inch high targets). The degree to which this invariance prevails is dependent upon the gearing of the scope's internal mechanism which produces magnification change in response to power ring rotation; the gearing in some currently marketed variable power scopes is such as to render the turning angle increment essentially invariant with target height. Hence it is feasible to utilize an auxiliary incremental scale to compensate for angle-from-horizontal fire. In FIG. 15 there is shown an embodiment including a target height indicator plate 65 and a complimentary "angle from horizontal" plate 66 which together facilitate simultaneous compensation for variations in target height, altitude and angle of fire from horizontal. Used alone, the selector plate 65 allows for target height and altitude compensations and is similar to those shown in FIG. 8. To employ the complementary plate 66, the power ring 69 is first rotated to align the pointer 67 with the intersection of the appropriate target height and altitude lines on the indicator plate 65. Then that index mark in scale 68 which is observed to be exactly or most nearly aligned with the 0° line on the "angle from horizontal" plate is noted and the power ring 69 is rotated again such that the noted index mark is aligned with the line of the "angle from horizontal" plate that corresponds to the angle at which the shot is to be taken.

Ambient temperature variations also affect bullet trajectories. Increasing temperature increases muzzle velocity because of higher temperatures of powder combustion resulting in higher chamber pressures. (Published data indicate that increasing ambient temperatures from 0° to 100°F. can result in a muzzle velocity increase of about 200 f.p.s.) Higher ambient temperatures are also accompanied by lower air density which reduces aerodynamic drag. Both factors tend to produce a flatter trajectory with increasing temperature. This temperature effect can be readily compensated for by means discussed previously for other trajectory-affecting parameters.

Figure 14:
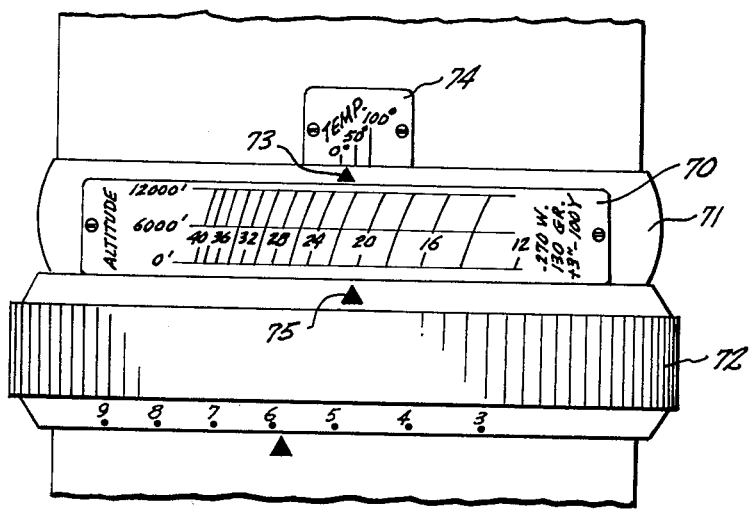

In FIG. 14, there is shown a variable power scope which has an indicator plate 70 similar to those shown in FIG. 8 mounted on a rotatable indicator plate ring 71. Additionally, the embodiment includes a conventional rotatable power ring 72. To compensate both for ambient temperature and altitude effects, the shooter first rotates the indicator plate ring so that the pointer 73 thereon is aligned with the prevailing ambient temperature on the fixed incremental plate 74. Having done this, the shooter then turns the power ring until the second pointer 75 on the power ring is opposite the appropriate intersection of lines on the indicator plate.

Any two parameters affecting trajectory can be compensated for by using an arrangement of calibrated indicator plates of the types shown in FIGS. 7, 8, 13, 14 and 15. Thus, temperature graduations could be included on the incremental scale in FIG. 15 in place of the angle values shown. Or three or more parameters can be compensated for such as by adding temperature graduations to the incremental scale shown in FIG. 15, by adding angle-from-horizontal graduations to the temperature scale shown in FIG. 14, or by using multiple incremental scales of the types shown in FIGS. 14 and 15. It will also be apparent that the effect of humidity (which affects air density and thereby the aerodynamic drag force acting on a bullet) also can be compensated for by similar means. With multiple incremental scales the combined compensations for several trajectory-affecting parameters will provide essentially exact compensation only over a limited range of parameter variations, and will provide approximate, but very useful, compensation over a broader range.

Target height need not be a primary variable on the indicator plate. In FIG. 17 there is shown a partial view of a scope of this invention which includes on the tubular body thereof 76 inscribed indicia 77 which relate to the nominal trajectories of four different cartridges (0.300 Winchester Magnum, 150 grain bullet; 0.270 Winchester, 130 grain bullet; 30–06, 150 grain bullet; and 0.300 Savage, 150 grain bullet) for an 18-inch target height. This embodiment is advantageous when only a single target height is to be considered and several trajectories are to be accommodated. Instead of relating to the trajectories of various cartridges, the indicia 77 could be stated in terms of muzzle velocity or could be replaced by indicia relating to other trajectory-affecting parameters such as altitude, temperature, angle-from-horizontal, etc. It will be noted that graduations (or indicia) such as shown on the various indicator (or "selector") plates depicted in FIGS. 6, 7, 8, 13, 14, 15 or inscribed on the scope such as in the manner shown in FIG. 17 can be considered both as means for selecting a specific target height and/or trajectory and also as a means for indicating a target height and/or trajectory for which the scope's magnification is set. In the appended claims such graduations or indicia are referred to as indicator means, it being understood that this terminology includes also their function and use as selector means.

The specific embodiments described above and shown in the accompanying drawings are merely illustrative of this invention and are not to be construed as limiting thereof. Thus, for example, target height and/or trajectory indicator means could be located internal to the scope in a manner similar to the internal range scale currently provided in the Accu-Range scope produced by Redfield Co. Or, instead of or in addition to employing target height indicator plates or trajectory-related indicia attached to or within or inscribed on a variable power scope of this invention, a shooter could be provided with one or more charts or related means indicating power settings appropriate for given trajectories and/or target heights, thereby enabling the shooter to adjust the power ring to the appropriate magnification setting.

Apertured reticles other than the types heretofore discussed can be used in the variable power scopes of this invention that include a reticle positioned at the rear focal plane. Thus, although not nearly as preferred, apertured reticles wherein target-bracketing and aiming apertures are not essentially adjacent one another (i.e., are overlapping or spaced-apart) can provide point-of-aim capability for a range of target heights and/or trajectories. Also, reticles in which the target bracketing means and aiming point indicators are not one and the same (e.g., see U.S. Pat. No. 3,392,450) can provide point-of-aim capability for a range of target heights and/or trajectories when embodied at the rear focal plane of variable power scopes of this invention. In FIG. 18 there is shown a reticle containing separated target-bracketing apertures and aiming points. A vertical cross hair 80 (indicating windage alignment) and a primary horizontal cross hair 81 (indicating elevation used for close range point-blank shooting) extend across the field of the scope and intersect proximate the center of the field of view. The reticle also contains four additional horizontal cross hairs 82, 83, 84, 85 spaced apart below the primary horizontal cross hair 81, contains horizontal cross hairs 87, 88, 89, 90 which in combination with baseline horizontal cross hair 86 define apertures useful in target bracketing, and indicator lines 91, 92, 93, 94 providing means relating bracketing apertures associated with cross hairs 87–90 to aiming points defined by the intersections of horizontal cross hairs 82–85 with vertical cross hair 80. The reticle is configured such that when the scope power adjusting means is set at an appropriate value of magnification P, a target of known height $h$ situated at a range at which its image appears to be bracketed between the baseline cross hair 86 and one of the cross hairs 87–90, when viewed through the scope, will be struck when aiming with the corresponding related aiming point. Thus, for example, if the image of the target of height $h$ is bracketed between cross hairs 86 and 88, the aiming point defined by the intersection of cross hairs 80 and 83 will produce a hit on the target. The vertical positioning of the long-range aiming points defined by the intersections of cross hairs 82–85 with cross hair 80 can be random, but the spacing of the target-bracketing cross hairs 87–90 is obviously dependent upon the vertical positioning selected for cross hairs 82–85 such that a target of height $h$, situated at the range where the bullet trajectory crosses the line of sight emanating from any of the given long-range aiming points, will be bracketed by the target-bracketing cross hairs related to that aiming point.

A variable power scope containing a reticle of the nonpreferred types just described (i.e., comprising means defining one or more aiming points vertically aligned and spaced apart from one another, and one or more related target-bracketing devices spaced apart from the aiming points) installed at the rear focus can be adjusted to relate to a range of target heights and/or trajectories simply by changing the scope power setting in a manner similar to that described for a scope containing a preferred reticle of the present invention. Increasing target heights h are accompanied by decreasing values of scope magnification; increasing flatness of the bullet's trajectory is accompanied by increasing values of scope magnification. When a nonpreferred reticle of the types presently discussed is configured to contain a single target-bracketing aperture and related long-range aiming point spaced vertically apart from the optical axis of the scope, the scope power-adjusting means can be calibrated to provide error-free capability over a range of target heights and trajectories, as was the case for the previously described single aperture embodiment of a preferred reticle of the present invention. And, when a nonpreferred reticle is configured to contain a plurality of target-bracketing apertures and related aiming points there usually can be, at most, one target height and/or trajectory for which there exists a scope power setting such that all aiming point/target-bracketing pairs will be simultaneously free from error (i.e., usually that combination of target height, trajectory and power setting for which the reticle was configured in the manner heretofore described), as was shown to be the case for the previously described two-aperture embodiment of a preferred reticle of the present invention. Calibration of the scope power adjusting means for target heights and/or trajectories differing from the ones for which the reticle is configured exactly can be done by determining appropriate scope power settings that minimize any resulting errors in the aiming system by methods analagous to those heretofore described in relation to the preferred reticles of the present invention. Hence it will be apparent that the presently discussed nonpreferred reticles can be practically useful over a range of target heights and/or trajectories, the limits of usefulness being reached when the errors in the aiming system approach a magnitude such as to produce a miss of the vital target area. It will also be apparent that target height and/or trajectory indicator means of the general types previously described can also be used in association with nonpreferred reticles of the type presently discussed.

The present invention also contemplates and includes the use of reticles of the types heretofore discussed wherein portions of the reticle can be selectively caused to enter and leave the field of view. In some such scopes, portions of the reticle snap into position through magnetic forces induced by motion of an external control ring which does not break the nitrogen seal (a good weatherproofing characteristic). With such "pop-up" reticles, portions of the reticle used only in conjunction with long-range shooting could be retracted for short-range shooting where point-blank aiming is used, leaving a completely uncluttered conventional reticle.

DESCRIPTION OF A SPECIFIC EMBODIMENT

The average trajectory of 85 grain bullets fired from a Remington Model 40-X rifle, caliber 6 mm Rem., was experimentally determined by drop testing. A five-shot group was fired at each of the ranges shown in Table VIII with the exception of 100 yds. range, where a six-shot group was fired. A conventional telescopic sight Table VIII

| Range (yards) | Drop (inches) | Maximum Group Dispersion (inches) |
|---|---|---|
| 100 | 0. | 1.125 |
| 300 | 11.4 | 5.0 |
| 400 | 27.5 | 6.0 |
| 500 | 52.4 | 7.75 |
| 550 | 69.8 | 9.5 |
| 600 | 90.25 | 6.75 |
| 650 | 115.2 | 10.5 | mounted such that its axis was 1¾ inches above the bore was used for sighting purposes. In Table VIII are shown the ranges, the measured bullet drop at each range relative to the aiming line of sight, and the maximum dispersion of each shot group. At most ranges the horizontal group dispersion exceeded the vertical dispersion, probably due to gusty wind conditions.

A theoretical Ingalls trajectory was found which closely matched the experimentally determined drop data. The ballistic coefficient and muzzle velocity for this Ingalls trajectory are 0.300 and 3100 ft./sec., respectively.

A two-aperture reticle of the present invention was installed at the rear focal plane of a variable power scope having a nominal power variation range of 4X to 12X. The reticle consisted of one vertical cross hair and three horizontal cross hairs. All four cross hairs extended completely across the field of view of the scope. The intersection of the upper horizontal cross hair and vertical cross hair was centered in the field of view of the scope and coincident with the optical axis. The three horizontal cross hairs were spaced apart so as to define two vertically adjacent apertures, the ratio of the vertical height of the upper aperture to the vertical height of the lower aperture being R=1.63 (the centers of the horizontal cross hairs being taken as the margins of the apertures). At the minimum and maximum power settings of the scope, the vertical angles subtended by the upper aperture were approximately 10.5 M.O.A. and 3.63 M.O.A., respectively.

Using the ballistic coefficient and muzzle velocity for the Ingalls trajectory referred to above, calibration parameters were calculated according to the analytical methods described hereinabove for five target heights (10, 14, 18, 26 and 34 inches), for a sighting-in relationship placing the bullet trajectory coincident with the primary line of sight at a range of 100 yds. with the axis of the scope mounted 1¾ inches above the rifle bore, with $\tau_1$, $\tau_2$, and $\tau_3 = 0$ and using $T = -1$. The calculated calibration parameters and performance characteristics for the rifle-scope combination are listed in Table IX for the five target heights.

Targets useful for calibrating the power varying means of the scope were constructed for the target heights listed in Table IX, using the data presented therein. Each target consisted of three horizontal lines spaced apart in the same proportions as the three horizontal cross hairs in the scope reticle. The vertical spacing of the lines on the targets was selected such that at a range of 60 yds. the angle subtended by the target would correspond to the values listed in Table IX (e.g., for a 10-inch target height, the spacing between the upper and center horizontal lines on the calibration target was 4.40 inches × 60 yds./100 yds. = 2.64 inches).

A target height indicator plate composed of masking tape was fixed to the rotatable power ring of the scope, and the scope was mounted 1¾ inches above the bore of the Model 40-X rifle.

TABLE IX

| Target Height (inches) | Angle Subtended By First Aperture (M.O.A.) | Sum of Angles Subtended By the Two Apertures (M.O.A.) | Impact Error (inches) | Range to First Aperture Window (yards) | Range at Which Trajectory Crosses 2nd Line of Sight (yards) | Range to Second Aperture Window (yards) | Range at Which Trajectory Crosses 3rd Line of Sight (yards) |
|---|---|---|---|---|---|---|---|
| 10 | 4.40 | 7.09 | +.48 | 227 | 322 | 371 | 408 |
| 14 | 5.52 | 8.90 | +.38 | 254 | 360 | 414 | 458 |
| 18 | 6.53 | 10.52 | +.32 | 276 | 391 | 450 | 500 |
| 26 | 8.33 | 13.44 | +.15 | 312 | 443 | 509 | 566 |
| 34 | 9.96 | 16.07 | +.07 | 341 | 486 | 557 | 622 |

The indicator plate was calibrated for each of the target heights by mounting the corresponding calibration target at a range of 60 yds., viewing the target through the scope and turning the power ring (in this scope the power ring is composed of a rotatable eyepiece assembly) until the three horizontal cross hairs in the scope appeared to be in simultaneous alignment with the three horizontal lines on the calibration target. At this setting of the power ring a mark was made on the indicator plate opposite a fixed pointer adjacent the power ring, and the corresponding target height was written on the indicator plate in proximity to the mark. In this manner a target height indicator plate was constructed and calibrated with indicators of target heights of 10, 14, 18, 26 and 34 inches.

The point from which test firing of the calibrated riflescope combination was to be conducted was selected. One target holder was positioned at a measured range of 100 yds. from the firing point. On this target holder were mounted other 10-inch, 18-inch and 34-inch calibration targets of the type discussed previously but sized for a calibrating range of 100 yds.

Six other target holders were dispersed randomly at arbitrary ranges and upon them were mounted a total of three 10-inch high targets, four 18-inch-high targets, and four 34-inch-high targets. The ranges to the targets were unknown except that rough estimates were made in positioning the closest and farthest target holders so that the targets would be positioned somewhere within the 200–700 yd. range of interest. Upon returning to the firing point, the 10, 18 and 34-inch target height calibrations on the indicator plate were checked for accuracy by viewing the calibration targets mounted at 100 yds. The 10-inch and 34-inch target height calibrations agreed perfectly with those previously established using a 60-yd. range. The 18-inch target height calibration appeared to be slightly different when viewed at 100 yds. (the difference bordered on the limit of optical resolution); accordingly, the 18-inch target height calibration on the indicator plate was remarked using the 100 yd. calibration target.

The first firing was conducted at the measured range of 100 yds. to sight in the rifle-scope combination such that the bullet trajectory intersected the primary line of sight of the scope at this range. Several rounds were then fired at a 100-yd. target using different scope power settings for each shot to confirm that the primary line of sight of the scope was positioned on the optical axis thereof. This test firing resulted in negligible impact dispersion.

Firing at the long range targets was then commenced. During the two shooting sequences described hereinafter, the shooters employed the aiming method described in relation to FIGS. 3a–c and did not attempt to estimate the target ranges or proper hold-over. The first shooting sequence consisted of the inventor firing one shot at each of the 10-inch and 34-inch targets and two shots at each 18-inch target, the power ring of the scope having been turned to the appropriate target height setting before each series of shots. The results of the first shooting sequence were viewed and recorded after firing of the entire sequence was completed. It was found that every shot had hit its intended target. The range to each target holder was measured, the position of each bullet hole in the targets was measured and recorded and the bullet holes were taped shut from the back of the targets so that they would not be visible from the firing point. The results of the first shooting sequence are tabulated in Table X.

Table X

| Range of Target (yards) | 10-Inch Target | 18-Inch Target | 34-Inch Target |
|---|---|---|---|
| | Height of Bullet Impact Point Above Target Center (inches) | | |
| 253 | 0.6 (4.6) | −0.4 −0.7 (−0.1) | |
| 309 | 1.5 (3.5) | 4.6 7.5 (9.1) | |
| 408 | 2.6 | 7.5 7.9 | 10.6 |
| 505 | | 2.0 5.8 (−3.0) (0.8) | −0.3 (1.8) |
| 582 | | | 5.3 (−1.6) |
| 642 | | | 7.5 (4.8) |

Note: Results of second shooting sequence are shown in parentheses.

The scope-rifle combination, the sighting system embodied therein and the aiming method described in relation to FIGS. 3a–c were explained to and examined by a second shooter who was not present during the first sequence and who had no knowledge of the ranges at which the long-range targets were posted. The second shooter then fired three shots at a 100-yd. target to verify the 100-yd. sighting-in point followed by one shot at each of the long-range targets (except two shots at the farthest 18-inch target) with the power ring set to the value on the target height indicator plate appropriate for each target height. The second shooter did not fire at the 408-yd. targets because the target holder had been blown over by wind. The targets were subsequently examined and the results of the second sequence of shots were recorded and are given in Table X in parentheses. The shot fired at the 18-inch target at 309 yds. hit ⅛-inch above the upper edge of the target, striking the backing material upon which the targets were mounted. Each of the other shots hit the intended target.

What is claimed is:

1. In combination, a firearm capable of propelling a bullet along a substantially predeterminable trajectory and a telescopic sight for aiming at targets of known or estimatable heights mounted on said firearm, said sight including power varying means for varying the power of magnification of images viewed therethrough and a reticle comprising means defining first and second vertically aligned target-spanning and aiming apertures located proximate the center of the field of view of said sight, the height of said first aperture being greater than the height of said second aperture, and the lower margin of said first aperture being coincident with the upper margin of said second aperture or vertically spaced from said upper margin by a distance not exceeding the lesser of (a) the difference of the heights of said apertures and (b) one quarter the height of said first aperture, the reticle being so positioned within the sight that the apparent angles subtended by said apertures vary inversely to the power of magnification, and said sight being so angled relative to the bore of said firearm and said apertures being so vertically dimensioned that:

there is a first power of magnification to which there is a related first target height $h_1$ and when said firearm is discharged while said sight, at said first power of magnification, is aimed at a firs target of height $h_1$ located at a first distance from said firearm such that the upper and lower margins of said first aperture respectively coincide with the upper and lower margins of the image of said first target, the bullet discharged will strike said first target;

and when said firearm is discharged while said sight, at said first power of magnification, is aimed at a second target of height $h_1$ located at a second distance from said firearm substantially greater than said first distance such that the upper and lower margins of said second aperture respectively coincide with the upper and lower margins of the image of said second target, the bullet discharged will strike said second target;

and when said firearm is discharged while said sight, at said first power of magnification, is aimed at a third target of height $h_1$ located at a third distance from said firearm whereat the height of the image of said third target appears substantially smaller than the height of said first aperture and substantially greater than the height of said second aperture, aiming of the sight being such that the point midway between the lower margin of said first aperture and the upper margin of said second aperture is aligned coincident with the center of said third target, the bullet discharged will strike said third target.

2. The combination of claim 1 wherein said lower margin of said first aperture and said upper margin of said second aperture are commonly defined by a single reticle element.

3. The combination of claim 1 wherein said lower margin of said first aperture and said upper margin of said second aperture are coincident.

4. The combination of claim 1 wherein said sight is so angled relative to the bore of said firearm and said apertures are so vertically dimensioned that:

there is a second power of magnification substantially different in magnitude from the first to which there is a related second target height $h_2$ and when said firearm is discharged while said sight, at said second power of magnification, is aimed at a fourth target of height $h_2$ located at a fourth distance from said firearm such that the upper and lower margins of said first aperture respectively coincide with the upper and lower margins of the image of said fourth target, the bullet discharged will strike said fourth target;

and when the firearm is discharged while said sight, at said second power of magnification, is aimed at a fifth target of height $h_2$ located at a fifth distance from said firearm substantially greater than said fourth distance such that the upper and lower margins of said second aperture respectively coincide with the upper and lower margins of the image of said fifth target, the bullet discharged will strike said fifth target;

and when said firearm is discharged while said sight, at said second power of magnification, is aimed at a sixth target of height $h_2$ located at a sixth distance from said firearm whereat the height of the image of said sixth target appears substantially smaller than the height of said first aperture and substantially greater than the height of said second aperture, aiming of the sight being such that the point midway between the lower margin of said first aperture and the upper margin of said second aperture is aligned coincident with the center of said sixth target, the bullet discharged will strike said sixth target.

5. The combination of claim 4 wherein said sight further comprises target height indicator means for selectively indicating one of a plurality of target heights, the indicated target height varying inversely to said power of magnification and being $h_1$ at said first power of magnification and $h_2$ at said second power of magnification.

6. The combination of claim 5 wherein said power varying means includes a manual adjustment means exposed on the exterior of said sight, said target height indicator means being located on or proximate to said adjustment means.

7. The combination of claim 5 wherein said sight includes an elongated tubular body and wherein said power varying means includes a manually rotatable adjustment means encircling the body of said sight, said target height indicator means being positioned on or proximate to said adjustment means.

8. The combination of claim 5 wherein said target height indicator means includes means for correlating the relation between said indicated target height and said power of magnification to predictable variations in the trajectories of bullets to be discharged from said firearm.

9. The combination of claim 4 wherein said sight further comprises trajectory indicator means for selectively indicating one of a plurality of values of at least one parameter affecting the trajectories of bullets to be discharged from said firearm, the indicated value varying with the power of magnification.

10. The combination of claim 9 wherein said power varying means includes a manual adjustment means exposed on the exterior of said sight, said trajectory indicator means being located on or proximate to said adjustment means.

11. The combination of claim 1 wherein the vertical distance between said lower margin of said first aperture and said upper margin of said second aperture does not exceed one half the difference of the heights of said apertures.

12. The combination of claim 1 wherein the ratio of said height of said first aperture to the height of said second aperture is from 1.1 to 1.9.

13. The combination of claim 12 wherein the vertical distance from the upper margin of said first aperture to the optical axis of said telescopic sight does not exceed twice the height of said first aperture.

14. The combination of claim 13 wherein the apparent vertical angle subtended by said first aperture is between 2.5 and 5.5 M.O.A. when said power of magnification is set at the maximum power setting of said sight.

15. The combination of claim 13 wherein said ratio is from 1.10 to 1.45 and the apparent vertical angle subtended by said first aperture is between 1.0 and 3.0 M.O.A. when said power of magnification is set at the maximum power setting of said sight.

16. The combination of claim 12 wherein the upper margin of said first aperture is essentially vertically coincident with the optical axis of said sight.

17. The combination of claim 16 wherein the apparent vertical angle subtended by said first aperture is between 2.5 and 5.5 M.O.A. when said power of magnification is set at the maximum power setting of said sight.

18. The combination of claim 16 wherein said ratio is from 1.10 to 1.45 and the apparent vertical angle subtended by said first aperture is between 1.0 and 3.0 M.O.A. when said power of magnification is set at the maximum power setting of said sight.

19. The combination of claim 1 wherein said reticle further comprises a windage indicator extending vertically across the field of view, said windage indicator intersecting the optical axis of said sight and intersecting said apertures.

20. The combination of claim 19 wherein said apertures are defined by first, second and third vertically spaced-apart elevation indicators, said elevation indicators intersecting said windage indicator substantially at right angles thereto.

21. The combination of claim 20 wherein the uppermost of said elevation indicators is straight and horizontal and extends substantially completely across the field of view.

22. The combination of claim 20 wherein each of said elevation indicators is straight and horizontal.

23. A telescopic gunsight for targets of known or estimatable heights including a reticle comprising means defining first and second vertically aligned target-spinning and aiming apertures located proximate the center of the field of view of said gunsight, the apparent vertical angle subtended by each of said apertures being small in comparison to the apparent vertical angle subtended by the field of view of said gunsight, the ratio of the height of said first aperture to the height of said second aperture being from 1.1 to 1.9, and said lower margin of said first aperture being coincident with said upper margin of said second aperture or vertically spaced from said upper margin by a distance not exceeding the lesser of (a) the difference of the heights of said apertures and (b) one quarter the height of said first aperture.

24. The gunsight of claim 23 wherein said lower margin of said first aperture and said upper margin of said second aperture are commonly defined by a single reticle element.

25. The gunsight of claim 23 wherein said reticle further comprises a windage indicator extending vertically across the field of view of said gunsight, said windage indicator intersecting said first and second apertures.

26. The gunsight of claim 25, wherein said apertures are defined by first, second and third vertically spaced-apart elevation indicators, said elevation indicators intersecting said windage indicator substantially at right angles thereto.

27. The gunsight of claim 26 wherein one of said elevation indicators is straight and horizontal and extends substantially completely across the field of view of said gunsight.

28. The gunsight of claim 26 wherein each of said elevation indicators is straight and horizontal.

29. The gunsight of claim 23 wherein said apertures are defined by first, second and third vertically spaced-apart elevation indicators.

30. The gunsight of claim 29 wherein one of said elevation indicators is straight and horizontal and extends substantially completely across the field of view of said gunsight.

31. The gunsight of claim 29 wherein each of said elevation indicators is straight and horizontal.

32. The gunsight of claim 23 further comprising means defining a third target-spanning and aiming aperture vertically aligned with said first and second apertures, the height of said third aperture being less than the height of said second aperture, and the upper margin of said third aperture being coincident with the lower margin of said second aperture or vertically spaced from said lower margin by a distance not exceeding the lesser of (a) the difference of the heights of said second and third apertures and (b) one quarter the height of said second aperture.

33. The gunsight of claim 32 wherein said upper margin of said third aperture and said lower margin of said second aperture are commonly defined by a single reticle element.

34. The gunsight of claim 32 wherein the vertical distance between said lower margin of said second aperture and said upper margin of said third aperture does not exceed one half the difference of the heights of said second and third apertures.

35. The gunsight of claim 23 wherein the vertical distance between said lower margin of said first aperture and said upper margin of said second aperture does not exceed one half the difference of the heights of said apertures.

36. The gunsight of claim 23 wherein the lower margin of said first aperture is coincident with the upper margin of said second aperture.

37. The gunsight of claim 23 wherein said ratio is from 1.25 to 1.80.

38. The gunsight of claim 37 wherein the apparent vertical angle subtended by said first aperture is from 3.5 to 7.0 M.O.A.

39. The gunsight of claim 37 wherein the apparent vertical angle subtended by said first aperture is from 6.0 to 11.0 M.O.A.

40. The gunsight of claim 23 wherein said ratio is from 1.30 to 1.55, wherein the apparent angle subtended by said first aperture is from 4.5 to 6.0 M.O.A., and wherein the lower margin of the first aperture is coincident with the upper margin of said second aperture.

41. The gunsight of claim 23 wherein said ratio is from 1.15 to 1.70 and wherein the apparent angle subtended by said first aperture is from 1.5 to 5.0 M.O.A.

42. The gunsight of claim 23 further comprising power varying means for varying the power of magnification of images viewed therethrough.

43. The gunsight of claim 42 wherein said reticle is positioned at the ocular focal plane of said gunsight.

44. The gunsight of claim 42 wherein said reticle is so positioned within said gunsight that the apparent angles subtended by said apertures vary inversely to said power of magnification.

45. The gunsight of claim 44 wherein the vertical distance from the upper margin of said first aperture to the optical axis of said telescopic gunsight does not exceed twice the height of said first aperture.

46. The gunsight of claim 45 wherein the apparent vertical angle subtended by said first aperture is between 2.5 and 5.5 M.O.A. when said power of magnification is set at the maximum power setting of said gunsight.

47. The gunsight of claim 45 wherein said ratio is from 1.10 to 1.45 and wherein the apparent vertical angle subtended by said first aperture is between 1.0 and 3.0 M.O.A. when said power of magnification is set at the maximum power setting of said gunsight.

48. The gunsight of claim 44 wherein the upper margin of said first aperture is essentially vertically coincident with the optical axis of said gunsight.

49. The gunsight of claim 48 wherein the apparent vertical angle subtended by said first aperture is between 2.5 and 5.5 M.O.A. when said power of magnification is set at the maximum power setting of said gunsight.

50. The gunsight of claim 48 wherein said ratio is from 1.10 to 1.45 and wherein the apparent vertical angle subtended by said first aperture is between 1.0 to 3.0 M.O.A. when said power of magnification is set at the maximum power setting of said gunsight.

51. The gunsight of claim 44 further comprising target height indicator means for selectively indicating one of a plurality of target heights, the indicated target height varying inversely to said power of magnification.

52. The gunsight of claim 51 wherein said power varying means includes a manual adjustment means exposed on the exterior of said gunsight, said target height indicator means being located on or proximate to said adjustment means.

53. The gunsight of claim 51 wherein the target height indicator means includes means for selectively varying the relation between said indicated target height and said power of magnification in relation to a plurality of values of at least one parameter affecting bullet trajectories.

54. The gunsight of claim 44 further comprising trajectory indicator means for selectively indicating one of a plurality of values of at least one parameter affecting bullet trajectories, the indicated value varying with the power of magnification.

55. The gunsight of claim 54 wherein said power varying means includes a manual adjustment means exposed on the exterior of said gunsight, said trajectory indicator means being located on or proximate to said adjustment means.

56. A variable power telescopic gunsight for targets of known or estimatable heights comprising power varying means for varying the power of magnification of images viewed therethrough; a reticle comprising means defining a first target-spanning and aiming aperture, the apparent vertical angle subtended by said aperture being small in comparison to the vertical angle subtended by the field of view of said gunsight, said reticle being positioned within said gunsight such that said aperture is located proximate the center of the field of view and such that the apparent angle subtended by said first aperture varies inversely to said power of magnification; and said gunsight further comprising target height indicator means for selectively indicating one of a plurality of target heights, the indicated target height varying inversely to said power of magnification.

57. The gunsight of claim 56 wherein said power varying means includes a manual adjustment means exposed on the exterior of said gunsight, said target height indicator means being located on or proximate to said adjustment means.

58. The gunsight of claim 56 wherein said target height indicator means includes means for selectively varying the relation between said indicated target height and said power of magnification in relation to a plurality of values of at least one parameter affecting bullet trajectories.

59. The gunsight of claim 56 wherein said reticle further comprises a vertical indicator intersecting the optical axis of said gunsight and extending across the field of view to indicate windage alignment on a target.

60. The gunsight of claim 59 wherein said vertical indicator intersects said first aperture.

61. The gunsight of claim 56 wherein said reticle further comprises a second target-spanning and aiming aperture, said second aperture having a maximum vertical dimension smaller than said first aperture, and wherein the vertical center of said second aperture is located below the vertical center of said first aperture.

62. A variable power telescopic gunsight for targets of known or estimatable heights comprising power varying means for varying the power of magnification of images viewed therethrough; a reticle comprising means defining a first target-spanning and aiming aperture, the apparent vertical angle subtended by said aperture being small in comparison to the vertical angle subtended by the field of view of said gunsight, said reticle being positioned within said gunsight such that said aperture is located proximate the center of the field of view and such that the apparent angle subtended by said first aperture varies inversely to said power of magnification; and said gunsight further comprising trajectory indicator means for selectively indicating one of a plurality of bullet trajectories, the indicated trajectory varying with the power of magnification.

63. The gunsight of claim 62 wherein said power varying means includes a manual adjustment means exposed on the exterior of said gunsight, said trajectory indicator means being located on or proximate to said adjustment means.

64. The gunsight of claim 62 wherein said reticle further comprises a vertical indicator extending across the field of view of said gunsight to indicate windage alignment on a target.

65. The gunsight of claim 64 wherein said vertical indicator intersects said first aperture.

66. The gunsight of claim 62 wherein said reticle further comprises a second target-spanning and aiming aperture, said second aperture having a maximum vertical dimension smaller than said first aperture, and wherein the vertical center of said second aperture is located below the vertical center of said first aperture.

67. A variable power telescopic gunsight for targets of known or estimatable heights comprising power varying means for varying the power of magnification of images viewed therethrough; a reticle comprising means defining a target-bracketing device having spaced-apart visible portions for spanning a target, and means defining an aiming point related to said target-bracketing device, said aiming point being spaced vertically apart from the optical axis of said gunsight and spaced apart from said target-bracketing device, said reticle being so positioned within said gunsight that the apparent angles subtended by the elements of the reticle vary inversely to said power of magnification; and said gunsight further comprising target height indicator means for selectively indicating one of a plurality of target heights, the magnitude of the indicated target height varying inversely to said power of magnification.

68. The gunsight of claim 67 wherein the target height indicator means includes means for selectively varying the relation between said indicated target height and said power of magnification in relation to a plurality of values of at least one parameter affecting bullet trajectories.

69. A variable power telescopic gunsight for targets of known or estimatable heights comprising power varying means for varying the power of magnification of images viewed therethrough; a reticle comprising means defining a target-bracketing device having spaced-apart visible portions for spanning a target, and means defining an aiming point related to said target-bracketing device, said aiming point being spaced vertically apart from the optical axis of said gunsight and spaced apart from said target-bracketing device; said reticle being so positioned within said gunsight that the apparent angles subtended by the elements of the reticle vary inversely to said power of magnification; and the gunsight further comprising trajectory indicator means for selectively indicating one of a plurality of values of at least one parameter affecting bullet trajectories, the indicated value varying with the power of magnification.

70. A variable power telescopic gunsight for targets of known or estimatable heights comprising power varing means for varying the power of magnification of images viewed therethrough; a reticle comprising means defining a plurality of aiming points vertically aligned and vertically spaced apart from one another, and a plurality of target-bracketing devices spaced apart from said aiming points, each of said devices being related to a respective one of said aiming points and having spaced-apart visible portions for spanning a target of known or estimatable height; said reticle being so positioned within said gunsight that the apparent angles subtended by the elements of the reticle vary inversely to said power of magnification.

71. The gunsight of claim 70 wherein said reticle further comprises a vertical indicator extending across the field of view of said gunsight to indicate windage alignment on a target.

72. The gunsight of claim 71 wherein said aiming points are formed by the intersection of said vertical windage indicator with horizontally extending indicator means.

73. The gunsight of claim 72 wherein said target-bracketing devices are dispersed on said horizontally extending indicator means in non-overlapping relationship with one another.

74. The gunsight of claim 73 wherein said target-bracketing devices are spaced-apart, circular enclosures.

75. The gunsight of claim 70 further comprising target height indicator means for selectively indicating one of a plurality of target heights, the magnitude of the indicated target height varying inversely to said power of magnification.

76. The gunsight of claim 75 wherein said power varying means includes a manual adjustment means exposed on the exterior of said gunsight, said target height indicator means being located on or proximate to said adjustment means.

77. The gunsight of claim 75 wherein said target height indicator means includes means for selectively varying the relation between said indicated target height and said power of magnification in relation to a plurality of values of at least one parameter affecting bullet trajectories.

78. The gunsight of claim 70 further comprising trajectory indicator means for selectively indicating one of a plurality of values of at least one parameter affecting bullet trajectories, the indicated value varying with the power of magnification.

79. The gunsight of claim 78 wherein said power varying means includes a manual adjustment means exposed on the exterior of said gunsight, said trajectory indicator means being located on or proximate to said adjustment means.

80. In combination, a firearm capable of propelling a bullet along a substantially predeterminable trajectory and a fixed-power telescopic sight for aiming at targets of known or estimatable heights mounted on said firearm, said sight including a reticle comprising means defining first and second vertically aligned target-spanning and aiming apertures located proximate the center of the field of view of said sight, the height of said first aperture being greater than the height of said second aperture, and the lower margin of said first aperture and the upper margin of said second aperture being commonly defined by a single, opaque reticle element and being coincident or vertically spaced apart by a distance not exceeding the lesser of (a) the difference of the heights of said apertures and (b) one-quarter the height of said first aperture, said sight being so angled relative to the bore of said firearm and the heights of said apertures being such that:

when said firearm is discharged while said sight is aimed at a first target of height $h_1$ located at a first distance from said firearm such that the upper and lower margins of said first aperture respectively coincide with the upper and lower margins of the image of said first target, the bullet discharged will strike said first target;

and when said firearm is discharged while said sight is aimed at a second target of height $h_1$ located at a second distance from said firearm substantially greater than said first distance such that the upper and lower margins of said second aperture respectively coincide with the upper and lower margins of the image of said second target, the bullet discharged will strike said second target;

and when said firearm is discharged while said sight is aimed at a third target of height $h_1$ located at a third distance from said firearm whereat the height of the image of said third target appears substantially smaller than the height of said first aperture and substantially greater than the height of said second aperture, aiming of the sight being such that the point midway between the lower margin of the said first aperture and the upper margin of said second aperture is aligned coincident with the center of said third target, the bullet discharged will strike said third target.

81. The combination of claim 80 wherein the lower margin of said first aperture and the upper margin of said second aperture are coincident or vertically spaced apart by a distance not exceeding the lesser of (a) one-half the difference of the heights of said apertures and (b) one-quarter the height of said first aperture.

82. The combination of claim 80 wherein the lower margin of said first aperture and the upper margin of said second aperture are coincident.

83. The combination of claim 80 wherein the ratio of the height of said first aperture to the height of said aperture is from 1.1 to 1.9.

84. The combination of claim 83 wherein said ratio is from 1.25 to 1.80.

85. The combination of claim 84 wherein the apparent vertical angle subtended by said first aperture is from 3.5 to 7.0 M.O.A.

86. The combination of claim 83 wherein the apparent vertical angle subtended by said first aperture is from 6.0 to 11.0 M.O.A.

87. The combination of claim 83 wherein said ratio is from 1.30 to 1.55, and the apparent vertical angle subtended by said first aperture is from 4.5 to 6.0 M.O.A.

88. The combination of claim 80 wherein said reticle further comprises a windage indicator extending vertically across the field of view of said sight and intersecting said apertures.

89. The combination of claim 88 wherein said apertures are defined by first, second and third vertically spaced-apart elevation indicators, said elevation indicators intersecting said windage indicator substantially at right angles thereto.

90. The combination of claim 89 wherein one of said elevation indicators is straight and horizontal and extends substantially completely across the field of view of said sight.

91. The combination of claim 89 wherein each of said elevation indicators is straight and horizontal.

* * * * *